US012802317B2

(12) United States Patent
Salehi et al.

(10) Patent No.: US 12,802,317 B2
(45) Date of Patent: Nov. 17, 2026

(54) 3D DSA IMAGE RECONSTRUCTION

(71) Applicant: KONINKLIJKE PHILIPS N.V., Eindhoven (NL)

(72) Inventors: Leili Salehi, Waltham, MA (US); Grzegorz Andrzej Toporek, Cambridge, MA (US); Ayushi Sinha, Baltimore, MD (US); Ramon Quido Erkamp, Swampscott, MA (US); Ashish Sattyavrat Panse, Burlington, MA (US); Dirk Schäfer, Hamburg (DE); Daniël Simon Anna Ruijters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 225 days.

(21) Appl. No.: 18/721,390

(22) PCT Filed: Dec. 12, 2022

(86) PCT No.: PCT/EP2022/085273

§ 371 (c)(1),
(2) Date: Jun. 18, 2024

(87) PCT Pub. No.: WO2023/117509

PCT Pub. Date: Jun. 29, 2023

(65) Prior Publication Data

US 2025/0061620 A1 Feb. 20, 2025

Related U.S. Application Data

(60) Provisional application No. 63/292,894, filed on Dec. 22, 2021.

(30) Foreign Application Priority Data

Feb. 1, 2022 (EP) .................................... 22154493

(51) Int. Cl.
*G06T 12/20* (2026.01)

(52) U.S. Cl.
CPC .... *G06T 12/20* (2026.01); *G06T 2207/10116* (2013.01); *G06T 2211/404* (2013.01)

(58) Field of Classification Search
CPC ........... G06T 12/20; G06T 2207/10116; G06T 2211/404; G06T 2211/436
(Continued)

(56) References Cited

U.S. PATENT DOCUMENTS

| | | | |
|---|---|---|---|
| 9,786,069 | B2 | 10/2017 | Schafer et al. |
| 10,388,036 | B2 | 8/2019 | Chen et al. |

(Continued)

OTHER PUBLICATIONS

Sandoval-Garcia et al., "4D DSA a new technique for arteriovenous malformation evaluation: a feasibility study", J Neurointervent Surg. 2016; 8, pp. 300-304.

(Continued)

*Primary Examiner* — Ali Bayat

(57) ABSTRACT

A system (100) for reconstructing digital subtraction angiography, DSA, images (110) representing a region of interest (120) in an object (130), is provided. The system includes one or more processors (140) configured to: receive (S110) cone beam projection data (150) acquired during a portion of a revolution of a source-detector arrangement (160*s*, 160*d*) of a cone beam X-ray imaging system (170) around the object (130); reconstruct (S120) the cone beam projection data (150) acquired from one or more orientations within a first angular range ($Dq_1$), into a 3D mask image (170) representing the region of interest (120); and reconstruct (S130) the cone beam projection data (150) acquired from one or more orientations within a second angular range ($Dq_2$), into a temporal sequence of 3D DSA images (110) representing the region of interest (120), based on the reconstructed 3D mask image (170).

20 Claims, 10 Drawing Sheets

(58) Field of Classification Search
USPC .......................................................... 382/131
See application file for complete search history.

(56) References Cited

U.S. PATENT DOCUMENTS

| | | | | |
|---|---|---|---|---|
| 10,867,375 | B2 | 12/2020 | Schafer et al. | |
| 2005/0111722 | A1* | 5/2005 | Gerwin | G01N 23/046 378/207 |
| 2008/0232548 | A1* | 9/2008 | Tanaka | A61B 6/504 378/98.2 |
| 2014/0050302 | A1* | 2/2014 | Dennerlein | G06T 12/20 378/62 |
| 2014/0376791 | A1 | 12/2014 | Heigl et al. | |
| 2016/0171723 | A1* | 6/2016 | Claus | A61B 6/032 382/131 |
| 2017/0221233 | A1* | 8/2017 | Chen | G06T 12/20 |
| 2019/0076101 | A1* | 3/2019 | Pan | A61B 6/032 |
| 2020/0074700 | A1* | 3/2020 | Kowarschik | A61B 6/482 |

OTHER PUBLICATIONS

Li et al., "An enhanced AMART-RECON algorithm for time-resolved C-arm cone-beam" CT imaging, Yinsheng L. et al., IEEE Transactions on Medical Imaging, vol. 39, No. 6, Jun. 2020, pp. 1894-1905.

Yinsheng et al., Time-resolved C-arm cone beam CT angiography (TR-CBCTA) imaging from a single short-scan C-arm cone beam CT acquisition with intra-arterial contrast injection, Physics in Medicine & Biology, 63, (2018), 18 pages.

Lescher et al., "Time-resolved 3D rotational angiography: display of detailed neurovascular anatomy in patients with intracranial vascular malformations", NeuroIntervent Surg, 2017, 9, pp. 887-894.

Wagemans et al., "4D-CTA improves diagnostic certainty and accuracy in the detection of proximal intracranial anterior circulation occlusion in acute ischemic stroke", PLoS One, vol. 12 Issue 2, p. e0172356, (2017).

Grossberg et al., "The use of contrast-enhanced, time-resolved magnetic resonance angiography in cerebrovascular pathology", Neurosurgical Focus, vol. 47 Issue 6, p. E3, (2019).

Davis et al., "4D Digital Subtraction Angiography: Implementation and Demonstration of Feasibility", American Journal of Neuroradiology, vol. 34 Issue 10, pp. 1914-1921, (2013).

Lang et al., "4D DSA for dynamic visualization of cerebral vasculature: A single-center experience in 26 cases," American Jounral of Neuroradiology, vol. 38, No. 6, pp. 1169-1176, (2017).

Li et al., "Time-Resolved C-arm Cone Beam CT Angiography (TR-CBCTA) imaging from a single short-scan C-arm cone beam CT acquisition with intra-arterial contrast injection", Phys Med Biol., Author Manuscript; 63(7). pp. 1-32.

Langet et al., "Compressed Sensing Dynamic Reconstruction in Rotational Angiography", MICCAI 2012, Part I, LNCS 7510, pp. 223-230, (2012).

Podgorsak et al., "CT artifact correction for sparse and truncated projection data using generative adversarial networks", Medical Physics, vol. 48 Issue 2, pp. 615-626, (2021).

Zhang et al., "Artifact reduction in short-scan CBCT by use of optimization-based reconstruction", HHS Public Access Author manuscript, Phys Med Biol. May 7, 2016; 61(9), pp. 3387-3406.

Han et al., "Differentiated Backprojection Domain Deep Learning for Conebeam Artifact Removal", IEEE Transactions on Medical Imaging, vol. 39 Issue 11, pp. 3571-3582, (2020).

Oyama et al., "Image quality improvement in cone-beam CT using the super-resolution technique", Journal of Radiation Research, vol. 59 Issue 4, pp. 501-510, (2018).

Maier et al., "Three-dimensional anisotropic adaptive filtering of projection data for noise reduction in cone beam CT" Medical Physics, vol. 38 Issue 11, pp. 5896-5909, (2011).

International Search report and Written Opinion of PCT/EP2022/085273, dated Apr. 3, 2023.

* cited by examiner

3D DSA IMAGE RECONSTRUCTION

CROSS-REFERENCE TO PRIOR APPLICATIONS

This application is the U.S. National Phase application under 35 U.S.C. § 371 of International Application No. PCT/EP2022/085273, filed on Dec. 12, 2022, which claims the benefit of European Patent Application No. 22154493.5, filed on Feb. 1, 2022, and U.S. Provisional Application Ser. No. 63/292,894, filed on Dec. 22, 2021. These applications are hereby incorporated by reference herein.

TECHNICAL FIELD

The present disclosure relates to reconstructing 3D digital subtraction angiography "DSA" images. A system, a computer-implemented method, and a computer program product, are disclosed.

BACKGROUND

The progression from open surgery to minimally invasive image-guided therapy has accelerated dramatically over the past three decades. Today, imaging technologies such as X-ray provide real-time visualization of the anatomy without the need for large surgical incisions. Intra-operative imaging enables a surgeon to perform procedures such as aneurysm treatment, coronary artery angioplasty, cerebral endovascular thrombectomy, and tumor embolization via small incisions, dramatically reducing patient recovery times as compared to traditional "open" surgical procedures.

Such procedures are often performed using temporal sequences of 2D X-ray images, i.e. "fluoroscopic" X-ray images. These may be generated using a projection X-ray imaging system, either with or without contrast injection. In the former case, digital subtraction angiography "DSA" is often used to enhance detail in acquired images by subtracting from the acquired images, the corresponding pixel intensities of a background image.

Although a 2D X-ray image sequence can provide valuable information about an organ's structure and its hemodynamics with a low X-ray dose, the total amounts of X-ray dose, and contrast agent dose, may be high as a consequence of imaging a region of interest from multiple orientations in order to provide a desired view. Re-orienting a projection X-ray imaging system in order to generate a desired view is also time-consuming. Moreover, not all desired views may be achievable from such projection imaging systems due to mechanical constraints.

Time-resolved CT angiography "4D CTA" and MR angiography "4D MRA" provide temporal information about the 3D vascular structure, and also the hemodynamics of a region of interest. These imaging techniques have been used in clinical procedures such as cerebrovascular diagnostics and preoperative planning. However, despite demonstrating high agreement with DSA in terms of the hemodynamic information they provide, both of these imaging techniques currently suffer from degraded image quality as compared to DSA.

Time-resolved 3D DSA, also known as TR-3D DSA or 4D DSA, is a technique for 3D reconstruction of the vascular anatomy and hemodynamics using cone beam CT scanners. The quality of 4D DSA images may be comparable to that of 2D DSA images, and the effective imaging dose remains within the range of a standard angiographic sequence.

A document by Li, Y., et al., entitled "Time-resolved C-arm cone beam CT angiography (TR-CBCTA) imaging from a single short-scan C-arm cone beam CT acquisition with intra-arterial contrast injection," Phys. Med. Biol., vol. 63, no. 7, pp. 1-32, 2018, discloses a technique for generating TR-CBCTA images from a single short-scan CBCT data acquisition with contrast media injection.

However, there remains room to improve the reconstruction of 3D DSA images.

SUMMARY

According to one aspect of the present disclosure, a system for reconstructing DSA images representing a region of interest in an object, is provided. The system includes one or more processors configured to:

- receive cone beam projection data acquired during a portion of a revolution of a source-detector arrangement of a cone beam X-ray imaging system around the object, the portion of the revolution comprising a first angular range including one or more orientations of the source-detector arrangement prior to a contrast agent entering the region of interest and/or subsequent to the contrast leaving the region of interest, and a second angular range including one or more orientations of the source-detector arrangement whilst the contrast agent flows within the region of interest;
- reconstruct the cone beam projection data acquired from the one or more orientations within the first angular range, into a 3D mask image representing the region of interest; and
- reconstruct the cone beam projection data acquired from the one or more orientations within the second angular range, into a temporal sequence of 3D DSA images representing the region of interest, based on the reconstructed 3D mask image.

By reconstructing the projection data acquired prior to the contrast agent entering the region of interest and/or subsequent to the contrast leaving the region of interest 120 into a mask image, and subsequently reconstructing the cone beam projection data acquired from the one or more orientations within the second angular range, i.e. whilst the contrast agent flows within the region of interest, into the temporal sequence of 3D DSA images, based on the reconstructed 3D mask image, image artifacts in the region of interest arising from the contrast agent in the mask image are substantially reduced, thereby improving the quality of the reconstructed 3D DSA images and allowing to separate the temporal changing information from the static background. Reconstructing a temporal sequence of 3D images representing a region of interest in an object from a portion of a single revolution of the source-detector arrangement of a cone beam X-ray imaging system around the object is also faster and less disruptive of procedural workflow compared to using separate revolutions for mask and DSA image acquisition. Moreover, the provision of a temporal sequence of 3D DSA images facilitates detailed visualization of the complex anatomy in a region of interest, and the hemodynamic flow therein, thereby obviating some of the limitations of 2D views of a region of interest.

Further aspects, features, and advantages of the present disclosure will become apparent from the following description of examples, which is made with reference to the accompanying drawings.

DETAILED DESCRIPTION

Figure 1:
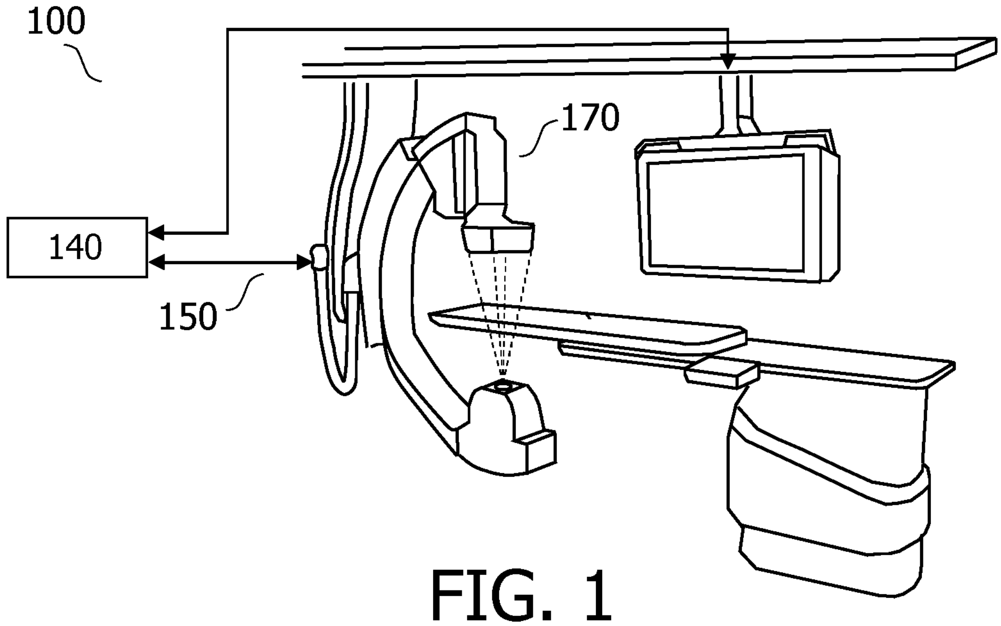
FIG. 1 is a schematic diagram illustrating an example of a system 100 for reconstructing DSA images representing a region of interest in an object, in accordance with some aspects of the present disclosure.

Examples of the present disclosure are provided with reference to the following description and figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to a system, may be implemented in a computer implemented method, and in a computer program product, in a corresponding manner.

In the following description, computer-implemented methods are described that relate to reconstructing DSA images that represent a region of interest in an object. Reference is made to an example region of interest in the form of a cerebral aneurism in a patient. However, it is to be appreciated that this example region of interest, and that this example object, serve only as an examples, and that the methods disclosed herein may also be used to reconstruct DSA images that represent other regions of interest. In general, the region of interest may be any region in the vasculature.

It is noted that the computer-implemented methods disclosed herein may be provided as a non-transitory computer-readable storage medium including computer-readable instructions stored thereon, which, when executed by at least one processor, cause the at least one processor to perform the method. In other words, the computer-implemented methods may be implemented in a computer program product. The computer program product can be provided by dedicated hardware, or hardware capable of running the software in association with appropriate software. When provided by a processor, the functions of the method features can be provided by a single dedicated processor, or by a single shared processor, or by a plurality of individual processors, some of which can be shared. The functions of one or more of the method features may for instance be provided by processors that are shared within a networked processing architecture such as a client/server architecture, a peer-to-peer architecture, the Internet, or the Cloud.

The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer-usable storage medium, or a computer-readable storage medium, the computer program product providing program code for use by or in connection with a computer or any instruction execution system. For the purposes of this description, a computer-usable storage medium or a computer readable storage medium can be any apparatus that can comprise, store, communicate, propagate, or transport a program for use by or in connection with an instruction execution system, apparatus, or device. The medium can be an electronic, magnetic, optical, electromagnetic, infrared, or a semiconductor system or device or propagation medium. Examples of computer-readable media include semiconductor or solid state memories, magnetic tape, removable computer disks, random access memory "RAM", read-only memory "ROM", rigid magnetic disks and optical disks. Current examples of optical disks include compact disk-read only memory "CD-ROM", compact disk-read/write "CD-R/W", Blu-Ray™ and DVD.

As mentioned above, there remains room to improve the reconstruction of 3D DSA images.

Figure 2:
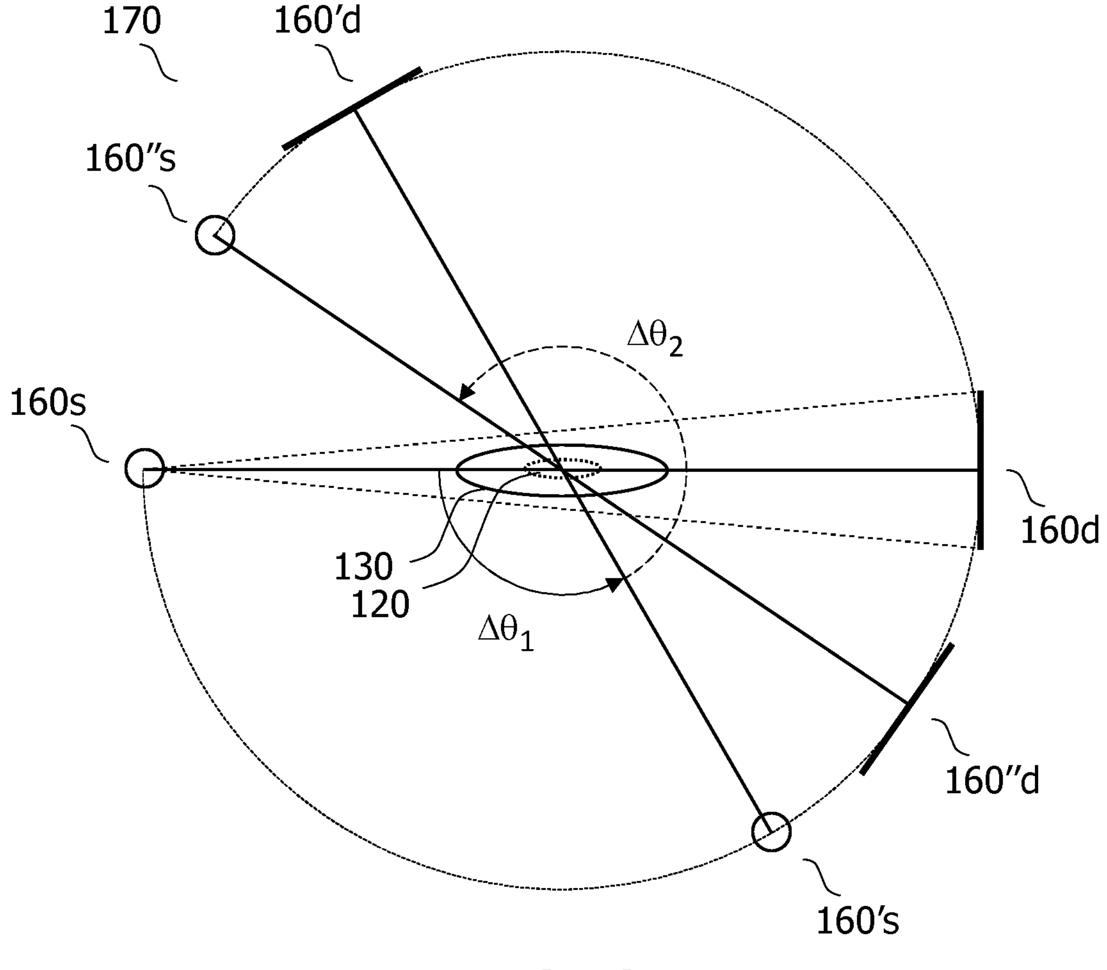
FIG. 2 is a is a schematic diagram illustrating an example of a source-detector arrangement 160*s*, 160*d*, in accordance with some aspects of the present disclosure.
Figure 3:
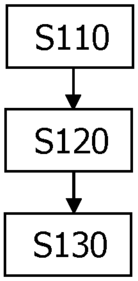
FIG. 3 is a flowchart illustrating an example of a method of reconstructing DSA images representing a region of interest in an object, in accordance with some aspects of the present disclosure.

FIG. 1 is a schematic diagram illustrating an example of a system 100 for reconstructing DSA images representing a region of interest in an object, in accordance with some aspects of the present disclosure. FIG. 2 is a is a schematic diagram illustrating an example of a source-detector arrangement 160*s*, 160*d*, in accordance with some aspects of the present disclosure. FIG. 3 is a flowchart illustrating an example of a method of reconstructing DSA images representing a region of interest in an object, in accordance with some aspects of the present disclosure. Operations described in relation to the system 100 illustrated in FIG. 1, may also be performed in the method illustrated in FIG. 3, and vice versa.

With reference to FIG. 1-FIG. 3; the system 100 includes one or more processors 140 configured to:

- receive S110 cone beam projection data 150 acquired during a portion of a revolution of a source-detector arrangement 160*s*, 160*d* of a cone beam X-ray imaging system 170 around the object 130, the portion of the revolution comprising a first angular range $Dq_1$ including one or more orientations of the source-detector arrangement 160*s*, 160*d* prior to a contrast agent entering the region of interest 120 and/or subsequent to the contrast leaving the region of interest 120, and a second angular range $Dq_2$ including one or more orientations of the source-detector arrangement 160*s*, 160*d* whilst the contrast agent flows within the region of interest 120;
- reconstruct S120 the cone beam projection data 150 acquired from the one or more orientations within the first angular range $Dq_1$, into a 3D mask image 170 representing the region of interest 120; and
- reconstruct S130 the cone beam projection data 150 acquired from the one or more orientations within the second angular range $Dq_2$, into a temporal sequence of 3D DSA images 110 representing the region of interest 120, based on the reconstructed 3D mask image 170.

By reconstructing the projection data acquired prior to the contrast agent entering the region of interest and/or subsequent to the contrast leaving the region of interest 120 into a mask image, and subsequently reconstructing the cone beam projection data acquired from the one or more orientations within the second angular range, i.e. whilst the contrast agent flows within the region of interest, into the temporal sequence of 3D DSA images, based on the reconstructed 3D mask image, image artifacts in the region of interest arising from the contrast agent in the mask image are substantially reduced, thereby improving the quality of the reconstructed 3D DSA images and allowing to separate the temporal changing information from the static background.

Reconstructing a temporal sequence of 3D images representing a region of interest in an object from a single revolution of the source-detector arrangement of a cone beam X-ray imaging system around the object is also faster and less disruptive of procedural workflow compared to separate revolutions for mask and DSA image acquisition. Moreover, the provision of a temporal sequence of 3D DSA images facilitates detailed visualization of the complex anatomy in a region of interest, and the hemodynamic flow therein, thereby obviating some of the limitations of 2D views of a region of interest.

With reference to FIG. 1-FIG. 3, in the operation S110, cone beam projection data 150 is received. The cone beam projection data 150 that is received in the operation S110 may be received from a cone beam X-ray imaging system 170, or from a computer readable storage medium, or from the Internet or the Cloud, for example. Examples of cone beam X-ray imaging systems 170 include CT imaging systems and projection X-ray imaging systems that have 2D detectors, as described below. The cone beam projection data 150 may be received by the one or more processors 140 illustrated in FIG. 1. The cone beam projection data 150 may be received via any form of data communication, including wired, optical, and wireless communication. By way of some examples, when wired or optical communication is used, the communication may take place via signals transmitted on an electrical or optical cable, and when wireless communication is used, the communication may for example be via RF or optical signals.

The cone beam projection data 150 may be generated by any CT imaging system that includes a source-detector arrangement 160*s*, 160*d* in which the detector is a 2D detector. A CT imaging system typically generates image data whilst rotating, or stepping, an X-ray source-detector arrangement around an imaging region. A CT imaging system may have a cone beam by virtue of the cone-shaped volume defined by the overlap between the beam emitted by its X-ray source, and the 2D detector. Historically, the term CBCT imaging system has been applied to a dedicated type of CT imaging system having a cone-shaped beam. However, in more-recent CT imaging systems, 2D detectors are commonplace, and these CT imaging systems may also generate the cone beam projection data. Thus, in general the cone beam projection data 150 may be generated by any CT imaging system having a 2D detector.

As mentioned above, the cone beam projection data may alternatively be generated by a projection X-ray imaging system having a 2D detector. Projection X-ray imaging systems typically include a support arm such as a so-called "C-arm", or an "O-arm", that supports an X-ray source-detector arrangement. Projection X-ray imaging systems may alternatively include a support arm with a different shape to these examples. The X-ray source and 2D X-ray detector of a projection X-ray imaging system generate projection data for a cone-shaped volume that is determined by the overlap between the beam emitted by the X-ray source, and the 2D X-ray detector. Projection X-ray imaging systems typically generate projection X-ray images with the support arm held in a static position with respect to an imaging region during the acquisition of image data. However, some projection X-ray imaging systems are capable of generating projection data whilst rotating, or stepping, an X-ray source-detector arrangement around an imaging region, and thus generate projection data in a similar manner to a CT imaging system. Such projection X-ray imaging systems may also generate the cone beam projection data 150. By way of some examples, the cone beam projection data 150 may be generated by projection X-ray imaging systems such as the Allura, or the Veradius C-arm-based X-ray imaging systems marketed by Philips Healthcare, Best, The Netherlands.

An example of a source-detector arrangement 160*s*, 160*d* of a cone beam X-ray imaging system 170 is illustrated in FIG. 2. In FIG. 2, dashed lines between the X-ray source 160*s* and the X-ray detector 160*d* indicate the extent of the cone-shaped beam within which X-rays emitted by the X-ray source 160*s* are detected by the X-ray detector 160*d*. A solid line connecting the X-ray source to the center of the X-ray detector illustrates a central ray of the cone-shaped beam. It is to be appreciated that the X-ray detector 160*d* illustrated in the example in FIG. 2 has a 2D shape. This example 2D shape is linear in the plane of the drawing, and also extends into the plane of the drawing. In the illustrated example, the 2D detector is therefore planar. However, in other examples, the 2D detector may have another shape, such as a curved shape. Thus, in other examples, the 2D detector may have a 2D shape that represents a portion of a cylinder, or a sphere, for example. In so doing, the X-ray detector 160*d* detects a cone-shaped beam of X-rays emitted by the X-ray source 160*s*.

The X-ray source 160*s* and X-ray detector 160*d* in FIG. 2 are arranged at diametrically opposing positions with respect to a rotation axis. One or more motors (not illustrated in FIG. 2) are coupled to the source-detector arrangement 160*s*, 160*d* and are configured to rotate the source-detector arrangement 160*s*, 160*d* about the rotation axis. The angle q in FIG. 2 represents the orientation of the X-ray source 160*s* with respect to an initial orientation. A volume swept by the cone-shaped beam during the rotation of the source-detector arrangement 160*s*, 160*d* defines an imaging region that is imaged by the source-detector arrangement 160*s*, 160*d*. In use, an object 130 having a region of interest 120 is disposed within the imaging region. The cone beam projection data 150 is then acquired whilst the source-detector arrangement 160*s*, 160*d* rotates around the object.

In the operation S110, cone beam projection data 150 is acquired during a portion of a revolution of a source-detector arrangement 160*s*, 160*d* of the cone beam X-ray imaging system 170 around the object 130. The portion of the revolution includes a first angular range, illustrated as $Dq_1$, that includes one or more orientations of the source-detector arrangement 160*s*, 160*d* prior to a contrast agent entering the region of interest 120. The portion of the revolution also includes a second angular range $Dq_2$ that includes one or more orientations of the source-detector arrangement 160*s*, 160*d* whilst the contrast agent flows within the region of interest 120. In FIG. 2, the first angular range $Dq_1$ corresponds to orientations of the source-detector arrangement that occur at times prior to a contrast agent entering the region of interest 120, i.e. between the orientations labelled as 160*s*, 160*d*, and 160'*s*, 160 *d*. The second angular range $Dq_2$ corresponds to orientations of the source-detector arrangement that occur whilst the contrast agent flows within the region of interest 120, i.e. between the orientations labelled as 160'*s*, 160'*d*, and 160"*s*, 160"*d*. A distinction may be made between the time prior to contrast agent entering the region of interest, and the time whilst the contrast agent flows within the region of interest, by analyzing the cone beam projection data and identifying a position of a front of the contrast agent with respect to the region of interest 120, or based on a time of the injection, for example.

It is to be appreciated that the first angular range $Dq_1$ and the second angular range $Dq_2$ may also occur in reverse order. That is, for instance, during some revolutions of the source-detector arrangement, contrast agent may be present at the start of the revolution and the second angular range $Dq_2$ may therefore occur first, whilst images without contrast may occur towards the end of the revolution when contrast has washed out of the region of interest. The first angular range $Dq_1$ may therefore occur after $Dq_2$. In other words, the first angular range may alternatively include one or more orientations of the source-detector arrangement 160*s*, 160*d* that occur subsequent to the contrast leaving the region of interest 120. Moreover, the cone beam projection data from orientations that occur prior to a contrast agent entering the region of interest 120, as well as orientations that occur subsequent to the contrast leaving the region of interest 120, may be reconstructed into the 3D mask image in the operation S120. A distinction may be made between the time whilst the contrast agent flows within the region of interest, and the time subsequent to the contrast leaving the region of interest 120 by analyzing the cone beam projection data and respectively identifying a position of a front, and a trailing edge of the contrast agent.

The portion of the revolution, i.e. the total of $Dq_1$ and $Dq_2$, over which the cone beam projection data 150 is acquired in the operation S110 may be a complete revolution, or it may be less than a complete revolution of the source-detector arrangement 160*s*, 160*d*. In some examples, the portion of the revolution of the source-detector arrangement 160*s*, 160*d*, may be significantly less than 360 degrees. For example, the portion of the revolution may be 210 degrees, or it may be another value. The cone beam projection data 150 corresponding to the second angular range $Dq_2$ may be acquired whilst an Iodine-based contrast agent flows within the region of interest. Other types of contrast agents may alternatively be used, including contrast agents that include a Lanthanide, such as a Gadolinium, or indeed another substance that provides visibility of a flow in the vasculature into which the contrast agent is injected. The contrast agent may be injected into the vasculature from a syringe. The syringe may be controlled manually, or by a syringe driver. Together, the syringe and the syringe driver are often referred to as an injector. The injector may be controlled manually, or automatically. In one example, the time at which the second angular range begins, may be predicted based on the time of the injection of the contrast agent.

Returning to FIG. 3, in the operation S120, the cone beam projection data 150 acquired from the one or more orientations within the first angular range $Dq_1$, is reconstructed into a 3D mask image 170 representing the region of interest 120. Various examples of this reconstruction are now described.

In cone beam CT image reconstruction, projection data that corresponds to a "complete set" of orientations may be considered to be obtained from a range of rotational angles that is greater than or equal to 180 degrees plus the fan angle of the source-detector arrangement. Such a range of rotational angles provides single-pass projection data from all positions in the imaging region. When projection data is available for a "complete set" of orientations, conventional cone beam CT image reconstruction algorithms, or deep learning-based techniques that employ a neural network, may be used to reconstruct the 3D mask image 170 in the operation S120. However, in some instances, the first angular range $Dq_1$ may provide fewer orientations than a "complete set". For example, the first angular range $Dq_1$ may be 180 degrees or less, leaving at least some portions of the imaging region without any data at all. Using projection data from a smaller range of rotational angles than that necessary to provide a "complete set" of orientations, risks incurring truncation artifacts in the reconstructed image due to the absence of projection data for at least part of the imaging region.

Performing CT image reconstruction using CT projection data that is acquired from an angular range that is less than 180 degrees is sometimes referred-to as "limited angle" reconstruction because the projection data lacks data for at least some of the imaging region. In general, performing limited angle reconstruction from cone beam projection data exacerbates the truncation artifacts that are incurred with projection data acquired from an angular range that is less than 180 degrees plus the fan angle. However, image reconstruction techniques have been developed that reduce, or even eliminate these, and other artifacts. These include compressed sensing, iterative reconstruction algorithms, and various neural networks such as generative adversarial networks "GANs", and so forth. These image reconstruction techniques may be used to reconstruct the 3D mask image 170 from projection data that is obtained from a smaller range of rotational angles than a "complete set", including when the first angular range $Dq_1$ is 180 degrees or less. One example of such a technique is disclosed in a document by Langet, H. et al., entitled "Compressed Sensing Dynamic Reconstruction in Rotational Angiography," MICCAI 2012, Part I, LNCS 7510, pp. 223-230, 2012.

In some examples, the quality of the reconstructed 3D mask image 170 may be improved by applying a noise reduction technique, or an artifact reduction technique, to the cone beam projection data, prior to reconstructing the 3D mask image 170. In this regard, techniques disclosed in the following documents may be employed: "CT artifact correction for sparse and truncated projection data using generative adversarial networks" by Podgorsak, A., et al., Med. Phys., 48 (2), 2020; "Artifact reduction in short-scan CBCT by use of optimization-based reconstruction" by Zhang. Z. et al., Phys. Med. Biol., vol. 61, no. 9, pp. 3387-3406, 2016; "Differentiated Backprojection Domain Deep Learning for Conebeam Artifact Removal." by Han. Y., et al., IEEE Trans. Med. Imaging, vol. 39, no. 11, pp. 3571-3582, 2020; "Image quality improvement in cone-beam CT using the super-resolution technique." by Oyama, A., et al., J. Radiat. Res., vol. 59, no. 4, pp. 501-510, 2018; and "Three-dimensional anisotropic adaptive filtering of projection data for noise reduction in cone beam CT" by Maier. A., et al., Med. Phys., vol. 38, no. 11, pp. 5896-5909, 2011.

With continued reference to FIG. 3, in the operation S130, the cone beam projection data 150 acquired from the one or more orientations within the second angular range $Dq_2$, is reconstructed into a temporal sequence of 3D DSA images 110 representing the region of interest 120, based on the reconstructed 3D mask image 170.

Various examples of the operation S130 are described below. In a first group of these examples, the temporal sequence of 3D DSA images is generated by subtracting projection data to provide difference data, and reconstructing the difference data. In other words, a subtraction is performed in projection space. In a second group of these examples, the cone beam projection data acquired from the one or more orientations within the second angular range $Dq_2$, is reconstructed into a temporal sequence of 3D images; and the reconstructed 3D mask image 170 is subtracted from the reconstructed temporal sequence of 3D images. In other words, a subtraction is performed in image space. In general, the first group of examples and the second group of examples may employ similar image reconstruction techniques to generate the temporal sequence of 3D images as those described above for the 3D mask image 170. Such algorithms are known for the purpose of reconstructing images that represent static content. In this first group of examples, these algorithms may further be used in the operation S130 to reconstruct images that represent moving contrast agent. Thus, conventional CT image reconstruction algorithms, deep learning-based techniques, compressed sensing, iterative reconstruction algorithms, generative adversarial networks "GANs", and so forth may additionally be used to reconstruct the temporal sequence of 3D DSA images 110.

In the first group of examples, the one or more processors are configured to reconstruct S130 the cone beam projection data 150 acquired from the one or more orientations within the second angular range $Dq_2$, into the temporal sequence of 3D DSA images 110, by:

- subtracting, from the cone beam projection data acquired from the one or more orientations within the second angular range $Dq_2$, synthetic projection data generated by projecting the reconstructed 3D mask image 170 from the source **160*s* onto the detector 160*d* from the one or more corresponding orientations q'' of the source-detector arrangement 160*s*, 160*d*** within the second angular range $Dq_2$, to generate difference projection data at the one or more orientations within the second angular range $Dq_2$; and
- reconstructing the difference projection data to provide the temporal sequence of 3D DSA images 110.

Figure 4:
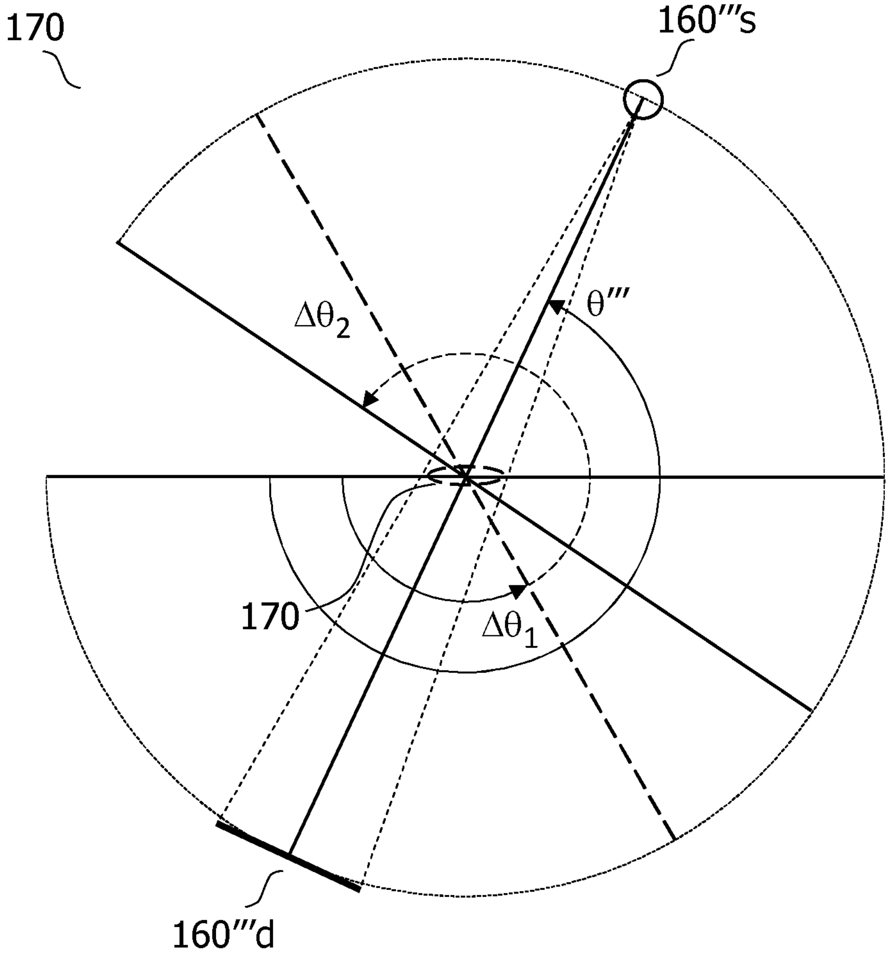
FIG. 4 is a schematic diagram illustrating an example of a source-detector arrangement 160*s*, 160*d* at an orientation q''' that is used to generate synthetic projection data by projecting a reconstructed 3D mask image 170 from the source 160*s* onto the detector 160*d*, in accordance with some aspects of the present disclosure.

The first group of examples is described with reference to FIG. 4, which is a schematic diagram illustrating an example of a source-detector arrangement **160*s*, 160*d* at an orientation q''' that is used to generate synthetic projection data by projecting a reconstructed 3D mask image 170 from the source 160*s* onto the detector 160*d*, in accordance with some aspects of the present disclosure. In this first group of examples, the cone beam projection data 150 that is acquired from the one or more orientations within the first angular range $Dq_1$ is reconstructed into a 3D mask image 170. Cone beam projection data 150 is also acquired from the one or more orientations within the second angular range $Dq_2$. The reconstructed 3D mask image 170 is then projected from the source onto the detector at the one or more orientations within the second angular range $Dq_2$ to provide synthetic projection data at each of the one or more orientations within the second angular range $Dq_2$. At corresponding orientations within the second angular range $Dq_2$, the synthetic projection data is then subtracted from the acquired cone beam projection data 150. This generates difference projection data at the one or more orientations within the second angular range $Dq_2$. The difference projection data is then reconstructed to provide the temporal sequence of 3D DSA images 110**.

In general, each image in the temporal sequence of 3D DSA images 110 may be reconstructed using the cone beam projection data from all of, or a subset of, the orientations within the second angular range $Dq_2$. As may be appreciated, contrast agent flows within the region of interest 120 whilst the source-detector arrangement rotates through the orientations within the second angular range $Dq_2$. Thus, with reference to FIG. 4, the contrast agent enters the region of interest 120 at the start of the start of the second angular range $Dq_2$, flows within the region of interest 120 during the second angular range $Dq_2$, and may still be within the region of interest or have washed-out of the region of interest at the end of the second angular range $Dq_2$. It is this flow of contrast agent that is reconstructed in the temporal sequence of DSA images.

At any given time in the temporal sequence, it is the projection data from the current orientation of the source-detector arrangement 160*s*, 160*d* that provides the most up-to-date information on the position of the front of the contrast agent. In other words, the orientation that provides the most up-to-date projection data that is required to reconstruct an image in the temporal sequence may be said to rotate around the object in accordance with the time of the image in the temporal sequence. However, image reconstruction using projection data from only a single orientation that rotates around the object in accordance with time in the temporal sequence in this manner, may be considered to result in significant image artifacts in the reconstructed images. Moreover, it is noted that the manner in which contrast agent flows within a region of interest is to gradually fill the vasculature over time. Consequently, at any given time, not only the projection data corresponding to the current orientation of the source-detector arrangement, but also the projection data corresponding one or more historic orientations of the source-detector arrangement within the second angular range $Dq_2$, i.e. at times leading-up to the current time, may also be relevant to reconstructing the image at the given time. Similarly, the projection data corresponding to one or more subsequent orientations of the source-detector arrangement within the second angular range $Dq_2$, i.e. at times following the current time, may also be relevant to reconstructing the image at the given time.

In accordance with these insights, various examples in the second group are described with reference to FIG. 5-FIG. 8, and in which a subset of the orientations within the second angular range $Dq_2$ is used to reconstruct each image in the temporal sequence.

In one example, the subset of orientations used to reconstruct each image in the temporal sequence represents a window 190 of rotational angles within the second angular range $Dq_2$. In this example, the second angular range $Dq_2$ includes a plurality of orientations of the source-detector arrangement 160*s*, 160*d*, and the one or more processors are configured to:

reconstruct S130 each image in the temporal sequence of 3D DSA images 110 using cone beam projection data 150 acquired from a subset of the plurality of orientations within the second angular range $Dq_2$; and wherein the subset of orientations used to reconstruct each image in the temporal sequence represents a window 190 of rotational angles within the second angular range $Dq_2$, and wherein the window has a leading edge 200 corresponding to an orientation of the source-detector arrangement 160*s*, 160*d* that rotates around the object in accordance with a time of the image in the temporal sequence.

Figure 5:
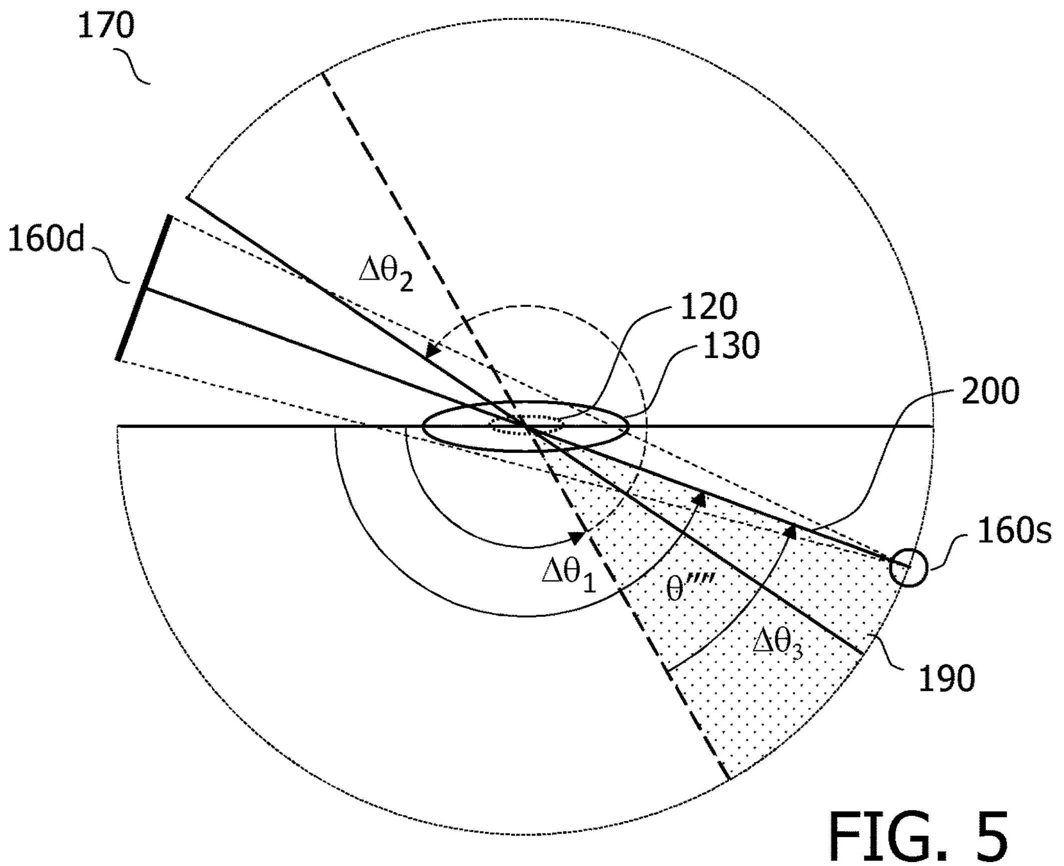
FIG. 5 is a schematic diagram illustrating an example of a source-detector arrangement 160*s*, 160*d* at an orientation q'''', and a window 190 of rotational angles within the second angular range $Dq_2$ defining orientations that are used to reconstruct an image in a temporal sequence, in accordance with some aspects of the present disclosure.

This example is illustrated with reference to FIG. 5, which is a schematic diagram illustrating an example of a source-detector arrangement 160*s*, 160*d* at an orientation q"", and a window 190 of rotational angles within the second angular range $Dq_2$ defining orientations that are used to reconstruct an image in a temporal sequence, in accordance with some aspects of the present disclosure. In FIG. 5, the X-ray source-detector arrangement has an orientation q"". This orientation is within the second angular range $Dq_2$, and thus the projection data acquired at this orientation is used to reconstruct the temporal sequence of images in the operation S130. The orientation q"" may be considered to represent a current orientation of the X-ray source-detector arrangement at the current time t. The window 190 of rotational angles for the current orientation q"" has a leading edge 200. The leading edge 200 of the window may be defined as the orientation of the central ray of the X-ray source with respect to the rotation axis at the current time t. The window 190 of rotational angles encompasses the range of rotational angles $Dq_3$. In this example, the cone beam projection data acquired from all orientations within the window 190, i.e. from the start of the second angular range $Dq_2$ up to and including the current orientation q"" at the current time t, is used to reconstruct the image in the temporal sequence corresponding to the current orientation q"" at the current time t.

Figure 6:
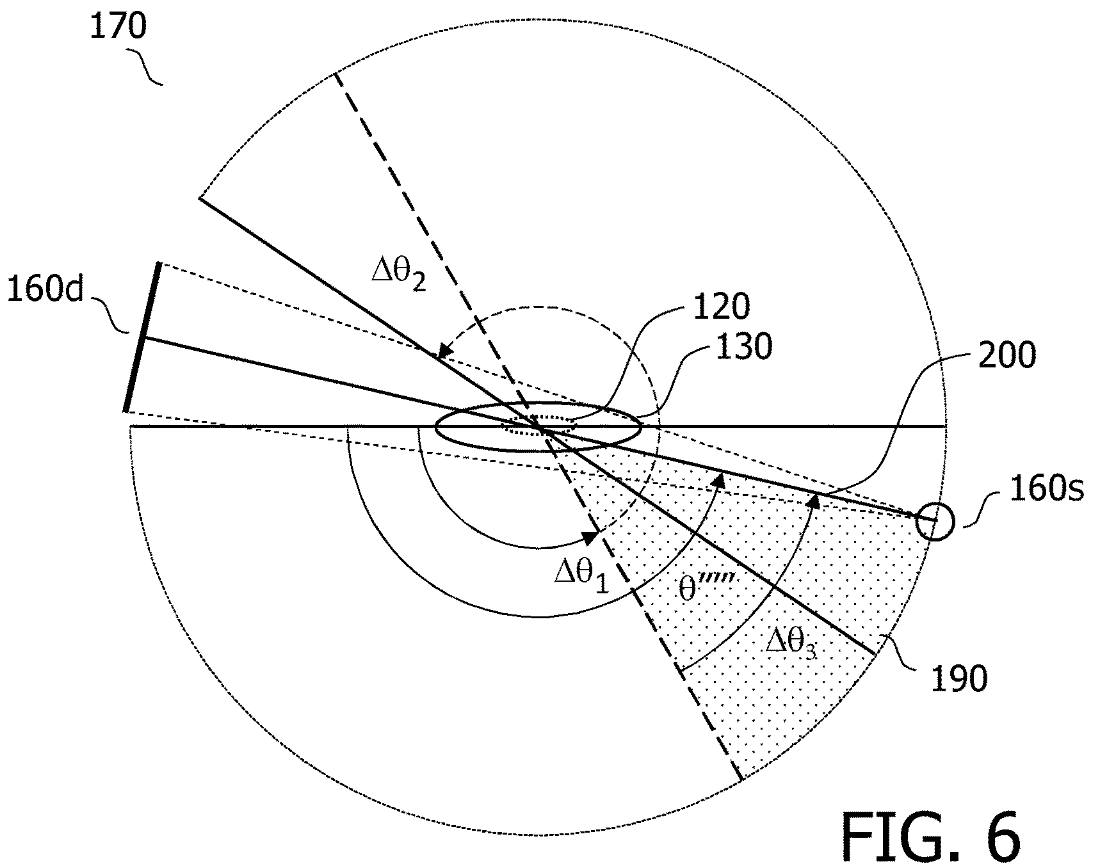
FIG. 6 is a schematic diagram illustrating an example of a source-detector arrangement 160*s*, 160*d* at an orientation q''''', and a window 190 of rotational angles within the second angular range $Dq_2$ defining orientations that are used to reconstruct another image in a temporal sequence, in accordance with some aspects of the present disclosure.

FIG. 6 is a schematic diagram illustrating an example of a source-detector arrangement 160*s*, 160*d* at an orientation q""', and a window 190 of rotational angles within the second angular range $Dq_2$ defining orientations that are used to reconstruct another image in a temporal sequence, in accordance with some aspects of the present disclosure. FIG. 6 depicts the orientation q""' and corresponding window 190 that is used to reconstruct a later image to the image described above with reference to FIG. 5. The time of this later image corresponds to the source-detector arrangement at the orientation q""'. As compared to FIG. 5, in FIG. 6, the leading edge 200 of the window 190 has rotated around the object in accordance with a time of the image in the temporal sequence, and consequently the window 190 encompasses a wider range of rotational angles $Dq_3$. As time progresses further, the window 190 encompasses an increasingly wider range of rotational angles $Dq_3$, until the source-detector arrangement reaches the orientation at the limit of the second angular range $Dq_2$. At this orientation, the cone beam projection data acquired from all orientations within the second angular range $Dq_2$ are used to reconstruct the corresponding image in the temporal sequence.

The use of a window 190 having a leading edge 200 corresponding to an orientation of the source-detector arrangement 160*s*, 160*d* that rotates around the object in accordance with a time of the image in the temporal sequence, has the advantage of increasing the geometric accuracy of the reconstructed images as time progresses in the temporal sequence. This is because a wide range of different orientations of the region of interest is used to reconstruct the images. However, a drawback of the window 190 increasing in size in this manner is that the motion of the contrast agent in the region of interest from historic orientations can introduce image artifacts. Thus, image quality may be degraded, particularly in later images in the temporal sequence, and which are reconstructed using a larger number of historic orientations. In order to compensate for this effect, in one example, the window 190 has a trailing edge 210 corresponding to an orientation of the source-detector arrangement 160*s*, 160*d* that rotates around the object in accordance with a time of the image in the temporal sequence. This rotation of the trailing edge of the window operates to limit the number of historic orientations which are used to generate the image at a given orientation, and thus time, in the temporal sequence. As may be appreciated, a trade-off between a geometrically accurate reconstructed image of the region of interest, and the severity of image artifacts from moving contrast agent, may be achieved by adjusting the size of this window 190 that is provided by the angular difference between the leading edge 200 and the trailing edge 210. Various examples of this are described with reference to FIG. 7 and FIG. 8.

Figure 7:
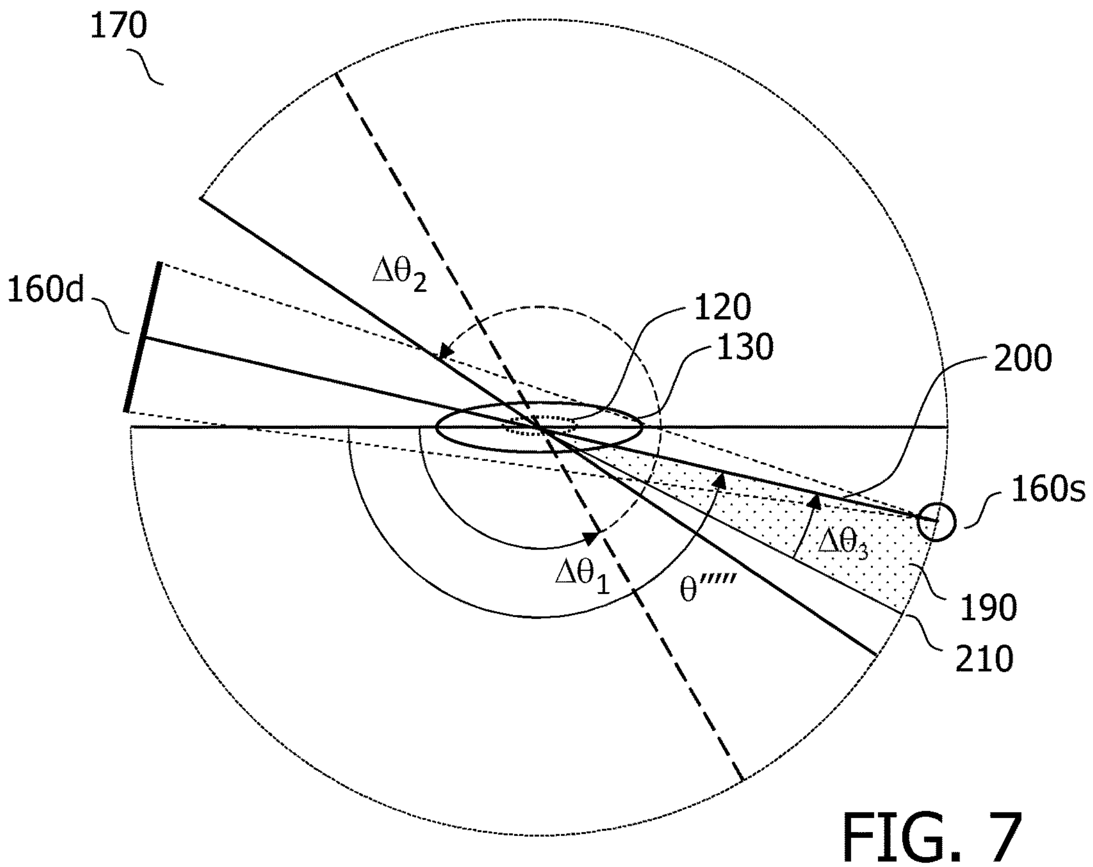
FIG. 7 is a schematic diagram illustrating an example of a source-detector arrangement 160*s*, 160*d* at an orientation q''''', and another window 190 of rotational angles within the second angular range $Dq_2$ defining orientations that are used to reconstruct an image in a temporal sequence, in accordance with some aspects of the present disclosure.

FIG. 7 is a schematic diagram illustrating an example of a source-detector arrangement 160*s*, 160*d* at an orientation q""', and another window 190 of rotational angles within the second angular range $Dq_2$ defining orientations that are used to reconstruct an image in a temporal sequence, in accordance with some aspects of the present disclosure.

In FIG. 7, the X-ray source-detector arrangement has an orientation q"""". This orientation is within the second angular range $Dq_2$, and thus the projection data acquired at this orientation is used to reconstruct the temporal sequence of images in the operation S130. The orientation q"""" may be considered to represent a current orientation of the X-ray source-detector arrangement. The window 190 of rotational angles for the current orientation q"""" has a leading edge 200, and a trailing edge 210. The trailing edge 210 corresponds to an orientation of the source-detector arrangement 160*s*, 160*d* that rotates around the object in accordance with a time of the image in the temporal sequence. In this example, the window 190 of rotational angles encompasses the range of rotational angles $Dq_3$. In this example, the cone beam projection data acquired from the current orientation, and zero or more historic orientations, is used to reconstruct the image in the temporal sequence corresponding to the orientation q"""". In this example the window 190 therefore has a fixed size. In other words, a predetermined number of one or more orientations are used to reconstruct the images in the temporal sequence. In the event that multiple orientations are used to reconstruct each image, it is to be appreciated that at the start of the second angular range $Dq_2$, there may be insufficient orientations to provide the predetermined number of orientations. Thus, at times corresponding to the start of the second angular range $Dq_2$, all available orientations may be used to reconstruct the images in the temporal sequence.

Figure 8:
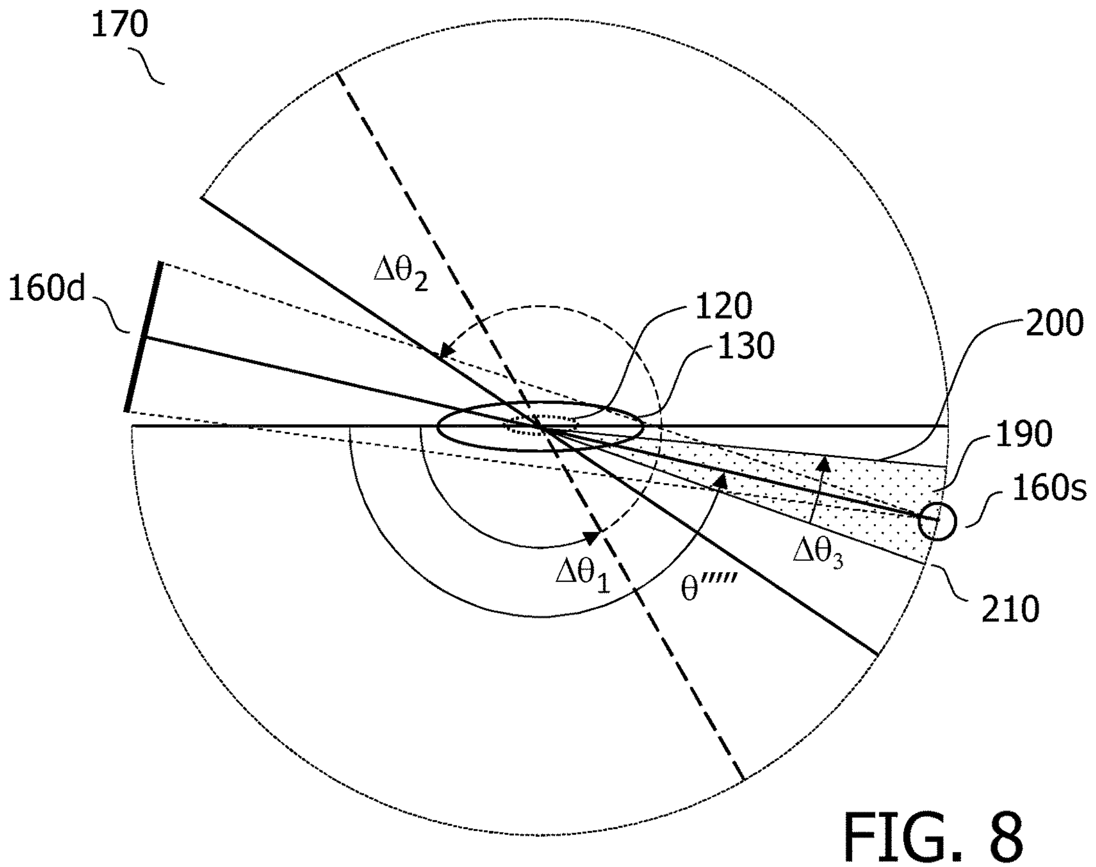
FIG. 8 is a schematic diagram illustrating an example of a source-detector arrangement 160*s*, 160*d* at an orientation q''''', and yet another window 190 of rotational angles within the second angular range $Dq_2$ defining orientations that are used to reconstruct an image in a temporal sequence, in accordance with some aspects of the present disclosure.

FIG. 8 is a schematic diagram illustrating an example of a source-detector arrangement 160*s*, 160*d* at an orientation q"""", and yet another window 190 of rotational angles within the second angular range $Dq_2$ defining orientations that are used to reconstruct an image in a temporal sequence, in accordance with some aspects of the present disclosure. This example is similar to the FIG. 7 example and similarly includes a leading edge 200 and a trailing edge 210 that both rotate around the object in accordance with a time of the image in the temporal sequence. In contrast to the FIG. 7 example, in the FIG. 8 example the window includes, for a current orientation and a corresponding current time in the temporal sequence, one or more future orientations of the source-detector arrangement. The reconstruction in the operation S130 is facilitated by delaying the reconstruction until such time as the future orientation(s) are available, whereupon the temporal sequence may be reconstructed. Alternatively, the temporal sequence of images that is reconstructed in the operation S130 may all be reconstructed after the data is acquired, and thus the reconstruction might not be performed in real-time.

A further insight by the inventors relates to the observation that contrast agent typically fills a region of interest gradually as the source-detector arrangement rotates around the object 130 through the second angular range $Dq_2$. Moreover, in many situations, only a small portion of the region of interest may actually include any contrast agent at all. This is because vessels typically only occupy a minor portion of an anatomical volume. Consequently, in addition to using the projection data from the orientations within the first angular range $Dq_1$ to reconstruct the 3D mask image 170 in the operation S120, projection data from orientations within the second angular range $Dq_2$, may also be used to reconstruct the 3D mask image 170. In other words, in some examples, the one or more processors are configured to reconstruct the 3D mask image 170 based further on cone beam projection data acquired from one or more orientations within the second angular range $Dq_2$.

In one example, portions of the region of interest that can be identified (e.g., classified or segmented) to correspond to anatomical structures outside of vascular structures (e.g., bone, soft tissue) may for example be identified in the projection data based on their X-ray absorption values, and used to selectively reconstruct bone or soft tissue or other regions in the 3D mask image.

In another example, since contrast agent moves through the vasculature in the region of interest during second angular range $Dq_2$, there will be a portion of the vasculature that does not include contrast in some of the images. For instance, regions of the vasculature that are distant from the contrast injection site will not have contrast agent in the earlier projection images, and regions of the vasculature that are close to the contrast injection site will not have contrast in the later images. By using neural networks such as generative adversarial networks "GANs" with a training set of non-contrast 3D volumes only, the network can be trained to ignore pixels with contrast and to generate non-contrast volumes from the cone beam projection data acquired from one or more orientations within the second angular range $Dq_2$.

In another example, a neural network may be trained to predict virtual contrast-free projection data for a current orientation within the second angular range $Dq_2$ based on the cone beam projection data, or the predicted virtual contrast-free projection data, from the current orientation and one or more different orientations of the source-detector arrangement, where different orientations relate to both previous and subsequent orientations in the neighborhood of the current orientation of the source-detector arrangement. Owing to the relatively small angular increment between successive orientations, the error introduced by the change in views between the two orientations can be expected to be small. The predicted virtual contrast-free projection data for the orientation(s) within the second angular range $Dq_2$ may then be used to reconstruct the 3D mask image in the operation S120. By providing this data from additional orientations to reconstruct the 3D mask image, the quality of the 3D mask image may be improved.

In another example, cone beam projection data 150 is acquired in both the first angular range $Dq_1$ and the second angular range $Dq_2$ using a second source-detector arrangement in addition to the source-detector arrangement described above. The source-detector arrangements are arranged transversely with respect to one another. The source-detector arrangements may be arranged orthogonally with respect to one another, for example. Such X-ray imaging systems are often referred-to as bi-plane imaging systems. In this example, the cone beam X-ray imaging system further comprises a second source-detector arrangement. The second source-detector arrangement is arranged transversely with respect to the source-detector arrangement 160*s*, 160*d*; and the one or more processors are configured to:

reconstruct S120 the 3D mask 170 image using the cone beam projection data acquired from both the source-detector arrangement 160*s*, 160*d* and the second source-detector arrangement;

reconstruct S130 the temporal sequence of 3D DSA images 110 using the cone beam projection data acquired from both the source-detector arrangement 160*s*, 160*d* and the second source-detector arrangement, based on the reconstructed 3D mask image 170.

Using the second source-detector arrangement in this manner improves the quality of the reconstructed images because the images are reconstructed from projection data having a wider range of orientations with respect to the region of interest.

Returning to FIG. 3, in some examples, a neural network is used in the operation S130 to reconstruct the difference projection data to provide the temporal sequence of 3D DSA images 110. These examples are described with reference to FIG. 9 and FIG. 10. In one example, the reconstructing the difference projection data to provide the temporal sequence of 3D DSA images 110, comprises:

inputting the difference projection data $DSA_t$ generated at the one or more orientations within the second angular range $Dq_2$ into a neural network 180; and predicting the images in the temporal sequence of 3D DSA images 110, $3DDSA^P_t$, in response to the inputting; and wherein the neural network 180 is trained to predict the images in the temporal sequence of 3D DSA images 110, $3DDSA^P_t$, from the difference projection data $DSA_t$.

This example is described with reference to FIG. 9, which is a schematic diagram illustrating an example of performing inference with a neural network 180 that is trained to predict images in a temporal sequence of 3D DSA images 110, $3DDSA^P_t$, from difference projection data $DSA_t$, in accordance with some aspects of the present disclosure. The FIG. 9 example depicts the inputting of difference projection data $DSA_t$, into a neural network 180 at different time intervals, with time increasing from left to right in the figure. In this example, the difference projection data $DSA_t$ is generated using the subtraction operation described above, i.e. by subtracting, from the cone beam projection data acquired from the one or more orientations within the second angular range $Dq_2$, synthetic projection data generated by projecting the reconstructed 3D mask image 170 from the source 160*s* onto the detector 160*d* from the one or more corresponding orientations q''' of the source-detector arrangement 160*s*, 160*d* within the second angular range $Dq_2$, to generate difference projection data at the one or more orientations within the second angular range $Dq_2$.

Figure 9:
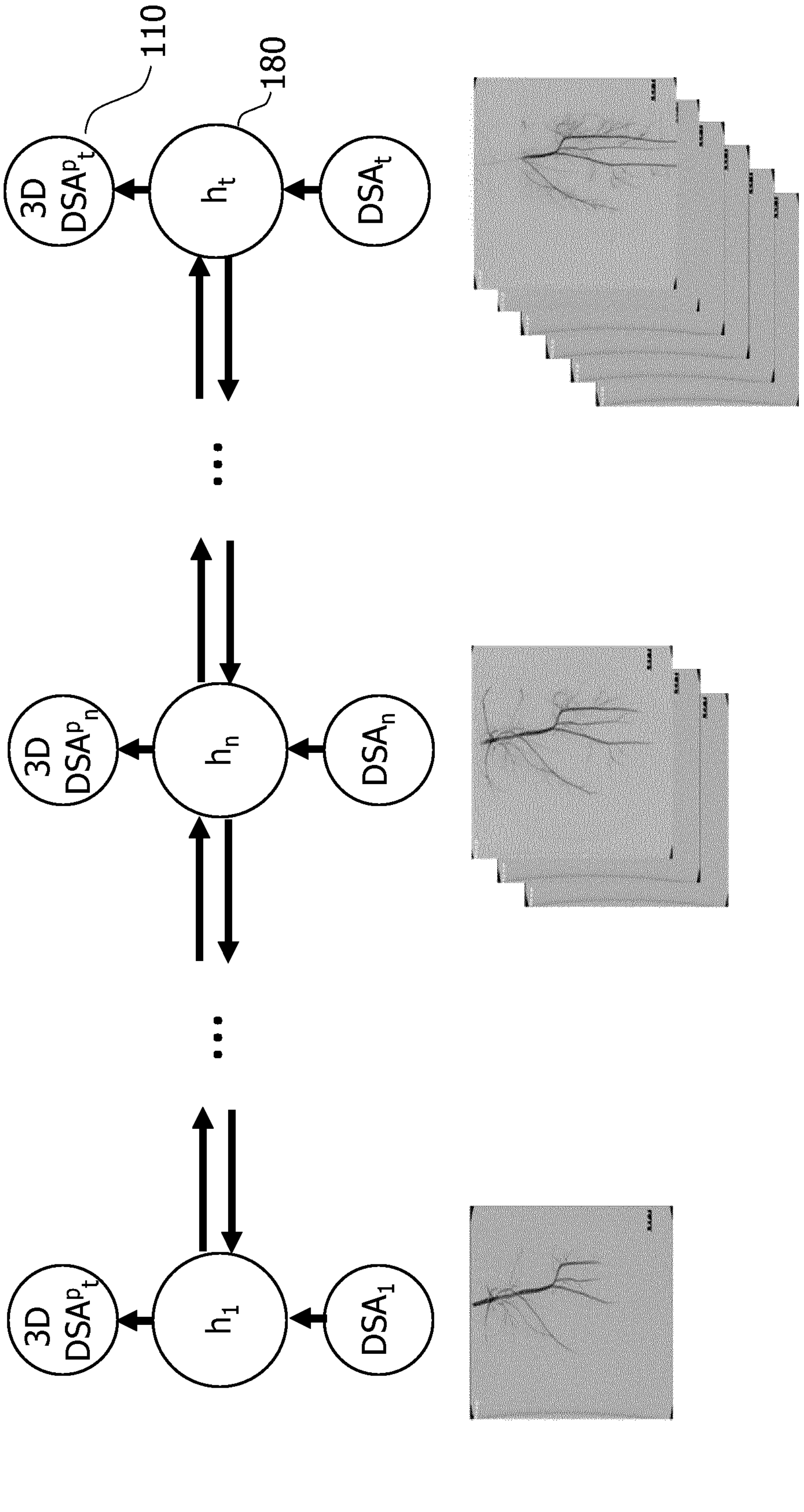
FIG. 9 is a schematic diagram illustrating an example of performing inference with a neural network 180 that is trained to predict images in a temporal sequence of 3D DSA images 110, $3DDSA^P_t$ from difference projection data $DSA_t$, in accordance with some aspects of the present disclosure.

As illustrated in FIG. 9, at any given time, t, or correspondingly, at any given orientation of the source-detector arrangement 160*s*, 160*d* within the second angular range $Dq_2$, difference projection data $DSA_t$ from the current orientation, and from zero or more additional orientations, is inputted into the neural network 180. The difference projection data $DSA_t$ generated in the above operation is two-dimensional, and is thus represented in FIG. 9 as images. At any given time, t, or correspondingly, at any given orientation of the source-detector arrangement 160*s*, 160*d* within the second angular range $Dq_2$, the output of the neural network is a predicted 3D DSA image at the corresponding time, i.e. $3DDSA^P_t$. It is noted that as time progresses from left to the right in FIG. 9, an increasing number of projection images are inputted into the neural network 180. Correspondingly, as the rotational angle of the source-detector arrangement 160*s*, 160*d* increases from left to the right in FIG. 9, at any given orientation, data from an increasing number of orientations is inputted into the neural network 180. This situation depicts the example in FIG. 5 and FIG. 6, wherein the orientations used to reconstruct each image in the temporal sequence represents a window 190 of rotational angles within the second angular range $Dq_2$, and the window 190 has a leading edge 200 corresponding to an orientation of the source-detector arrangement 160*s*, 160*d* that rotates around the object in accordance with a time of the image in the temporal sequence. Thus, in one example, the neural network 180 is trained to predict each image in the temporal sequence of 3D DSA images 110, $3DDSA^P_t$ from the difference projection data $DSA_t$ generated at the one or more orientations within the second angular range $Dq_2$; and wherein the difference projection data $DSA_t$ used to reconstruct each image in the temporal sequence represents a window 190 of rotational angles within the second angular range $Dq_2$, and wherein the window has a leading edge 200 corresponding to an orientation of the source-detector arrangement 160*s*, 160*d* that rotates around the object in accordance with a time of the image in the temporal sequence.

In this example, the initial images in the temporal sequence are therefore predicted using projection data from fewer orientations than later images in the temporal sequence. The final image in the temporal sequence, and which corresponds to the orientation of the source-detector arrangement at $Dq_2$, includes the data from all orientations within the second angular range $Dq_2$. Thus, in this example, the images in the temporal sequence are reconstructed using views from different orientations and with different amounts of contrast agent. It is noted, however, that the use of the above-described window to select the difference projection data serves only as an example, and that each image in the temporal sequence of 3D DSA images 110 may alternatively be reconstructed using the cone beam projection data from all of, or a subset of, the orientations within the second angular range $Dq_2$, as described in the examples above.

The neural network 180 illustrated in FIG. 9 may include an architecture such as a recurrent neural network or RNN, temporal convolutional network or TCN, architecture, for example. The architecture illustrated in FIG. 9 represents a RNN architecture. This neural network also includes connections between the hidden layers $h_{i=1 \ldots t}$. These connections may be in the form of a bidirectional long short-term memory "B-LSTM" architecture, as indicated by the horizontal bi-directional arrows in FIG. 9. During training and inference, each additional inputted image includes additional information about the vasculature since the contrast agent flows in the vessels, and also provides a slightly different view of the region of interest. The contrast agent tends not to completely drain from a particular region between these images, and therefore, multiple views of the same region of interest are captured by the orientations within the second angular range $Dq_2$. The connections between the hidden layers allow the hidden layers from the past to use information from future projections and also allow layers from the future to use information from past projections, thereby improving the predictions of the neural network. The training of the neural network 180 is described in detail below.

Continuing with the example neural network 180 described above with reference to FIG. 9, in one example, the predicted images in the temporal sequence $3DDSA^P_t$ are further projected from the source onto the detector, and used to constrain the predictions of the neural network. This example is described with reference to FIG. 10, which is a schematic diagram illustrating an example of performing inference with a neural network 180 that is trained to predict images in a temporal sequence of 3D DSA images 110, $3DDSA^P_t$ from difference projection data $DSA_t$, and in which each predicted image is projected to provide projected predicted image data $DSA^P_t$, in accordance with some aspects of the present disclosure.

Figure 10:
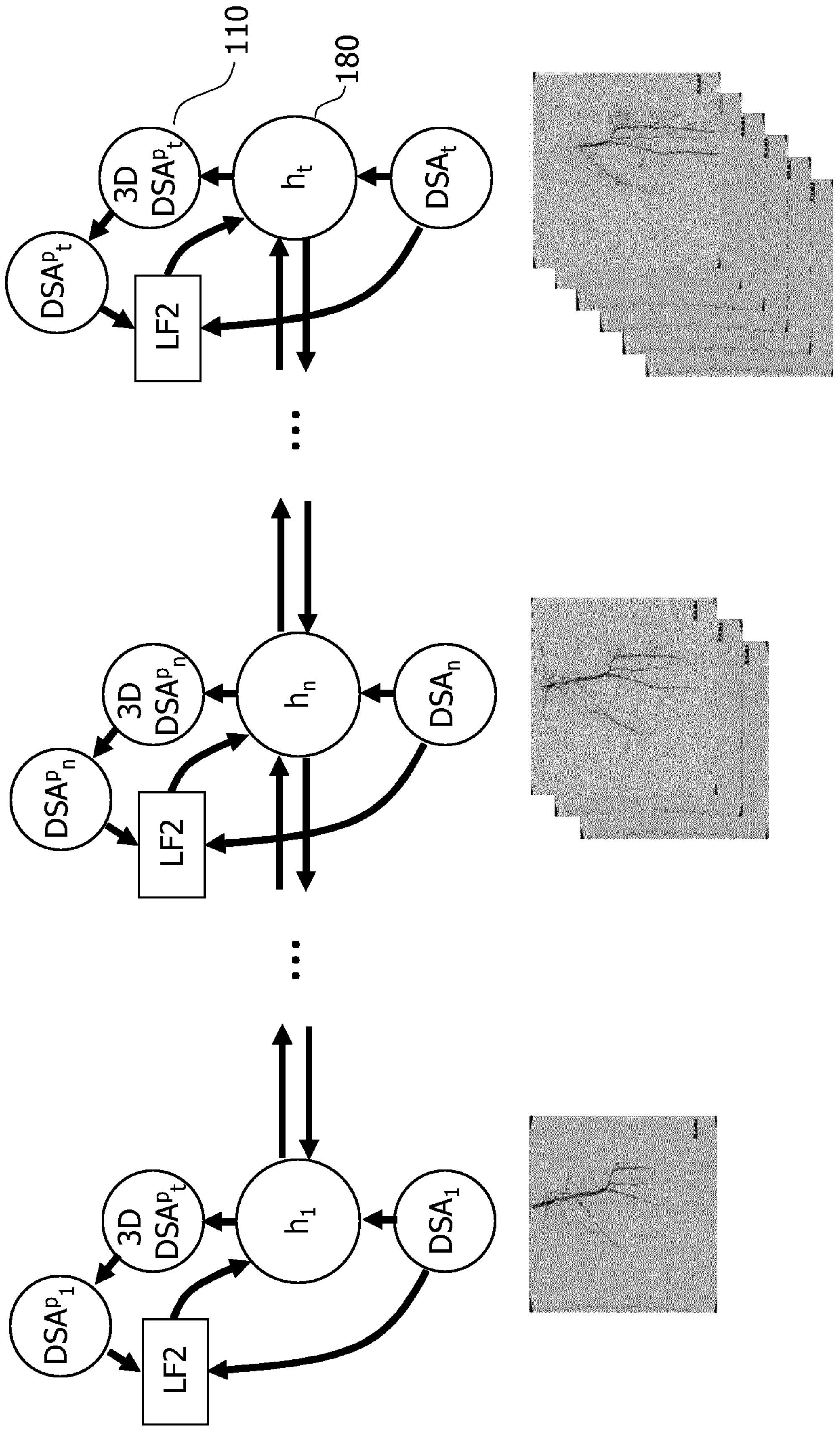
FIG. 10 is a schematic diagram illustrating an example of performing inference with a neural network 180 that is trained to predict images in a temporal sequence of 3D DSA images 110, $3DDSA^P_t$ from difference projection data $DSA_t$, and in which each predicted image is projected to provide projected predicted image data $DSA^P_t$, in accordance with some aspects of the present disclosure.

The FIG. 10 example is similar to the FIG. 9 example, and items in FIG. 10 having the same names as in FIG. 9 perform the same function as described above. In the FIG. 10 example, the additional item $DSA^P_t$ represents the projection of each predicted image in the temporal sequence of 3D DSA images $3DDSA^P_t$ from the source onto the detector from the orientation of the X-ray source-detector arrangement used to generate the difference projection data $DSA_t$. The additional item LF2 represents a loss function that calculates a difference between the projected predicted image at time t, i.e. $DSA^P_t$, and the difference projection data $DSA_t$ that is inputted into the neural network. As compared to the FIG. 9 example, in the FIG. 10 example, the one or more processors are further configured to project each predicted image in the temporal sequence of 3D DSA images 110, $3DDSA^P_t$ from the source onto the detector from the orientation of the X-ray source-detector arrangement used to generate the difference projection data $DSA_t$, to provide projected predicted image data $DSA^P_t$, and the neural network 180 is trained to predict each image in the temporal sequence of 3D DSA images 110, $3DDSA^P_t$ from the difference projection data $DSA_t$ based on a value of a loss function LF2 representing a difference between the projected predicted image data $DSA^P_t$, and the difference projection data $DSA_t$ generated at the corresponding orientation.

The projection of each predicted image in the temporal sequence of 3D DSA images $3DDSA^P_t$ is performed mathematically, and is based on the orientation of the source-detector arrangement with respect to the 3D DSA image $3DDSA^P_t$ at time t, and geometry of the cone beam X-ray imaging system that generates the cone beam projection data 150. Using the loss function LF2 to constrain the predictions of the neural network 180 in this manner has the effect of fine-tuning, or in other words, improving the predictions, of the neural network 180 because the predictions are constrained by the requirement for the projection of the predicted 3D image, $3DDSA^P_t$, to resemble the inputted difference projection data $DSA_t$. The value of the loss function LF2 may be calculated using a loss function such as the L1 loss, L2 loss, structural similarity (SSIM) loss, and so forth.

In either of the FIG. 9 or FIG. 10 examples, the one or more processors may also output a confidence value for the images in the predicted temporal sequence of 3D DSA images 110. $3DDSA^P_t$. Confidence values may be computed using various techniques. In one technique, confidence values may be computed by evaluating whether the features contributing to the network's predictions originate from the vasculature, i.e. from dark pixels in the inputted difference projection data $DSA_t$, or from other regions, i.e. from lighter or gray pixels. This may be determined by extracting feature maps from the intermediate convolutional layers of the neural network, postprocessing these, and then backprojecting them onto the inputted difference projection data $DSA_t$. A significant overlap between feature maps with high activations and dark pixels is indicative of high prediction confidence.

Other techniques for calculating confidence values may also be used. These include Grad-CAM, and the dropout technique. The dropout technique involves iteratively inputting the same data into the neural network and determining the neural network's output whilst randomly excluding a proportion of the neurons from the neural network in each iteration. The outputs of the neural network are then analyzed to provide mean and variance values. The mean value represents the final output, and the magnitude of the variance indicates whether the neural network is consistent in its predictions, in which case the variance is small and the confidence value is relatively higher, or whether the neural network was inconsistent in its predictions, in which case the variance is larger and the confidence value is relatively lower. The calculated confidence values may be outputted, for example in the predicted 3D DSA images, $3DDSA^P_t$. A percentage confidence may for example be displayed on the image, or a color representative of the confidence may be indicated on the image or a display. The outputting of the confidence values informs a user on the reliability of the neural network's predictions.

In either of the FIG. 9 or FIG. 10 examples, the neural network may be constrained to perform the reconstructions in the operations S120 and/or S130 with a higher degree of accuracy within a portion of the region of interest than outside the portion. The portion may be defined automatically, or by a user via a user input device. The neural network may be constrained to perform the reconstructions within the portion with higher accuracy by modifying a loss function in the neural network such that higher weights are applied to losses computed within the portion than outside the portion. Alternatively, cone beam projection data that is inputted into the neural network may be cropped such that only the portion of the region of interest is inputted into the neural network. The cropping may be performed such that the portion has a fixed size, or such that the portion has a size that depends on the orientation of the source-detector arrangement. In the latter case, the size of the portion may vary between projections since its size is based on the shape of the projection of the region of interest for each orientation. Instead of cropping the cone beam projection data differently for each orientation, a mask may be applied to the region of interest such that only data within the portion is inputted into the neural network, and data outside the portion is set to a zero value.

In either of the FIG. 9 or FIG. 10 examples, the computational load of reconstructing data in the operations S120 and/or S130 may be reduced by inputting a lower dimensional representation of the input data into the neural network. The acquired cone beam projection typically has high resolution, and it may also be acquired at a high frame rate. In order to reduce the computational load of processing this data, a lower dimensional representation of this data may therefore be generated and inputted into the neural network. The lower-dimensional representations may be obtained by cropping the input data or by resampling the input data to a lower resolution or lower frame rate. The lower-dimensional representations may also be learned by training a neural network, such as an autoencoder, for example, to predict a lower-dimensional representation of the inputted data. Before being inputted into the neural network, the projection data may therefore be inputted into the trained autoencoder, which would output a lower dimensional representation of the input data. This lower-dimensional representation would then be inputted into the neural network.

The training of the neural networks described above is now detailed.

In general, the training of a neural network involves inputting a training dataset into the neural network, and iteratively adjusting the neural network's parameters until the trained neural network provides an accurate output. Training is often performed using a Graphics Processing Unit "GPU" or a dedicated neural processor such as a Neural Processing Unit "NPU" or a Tensor Processing Unit "TPU". Training often employs a centralized approach wherein cloud-based or mainframe-based neural processors are used to train a neural network. Following its training with the training dataset, the trained neural network may be deployed to a device for analyzing new input data during inference. The processing requirements during inference are significantly less than those required during training, allowing the neural network to be deployed to a variety of systems such as laptop computers, tablets, mobile phones and so forth. Inference may for example be performed by a Central Processing Unit "CPU", a GPU, an NPU, a TPU, on a server, or in the cloud.

The process of training the neural network 180 described above therefore includes adjusting its parameters. The parameters, or more particularly the weights and biases, control the operation of activation functions in the neural network. In supervised learning, the training process automatically adjusts the weights and the biases, such that when presented with the input data, the neural network accurately provides the corresponding expected output data. In order to do this, the value of the loss functions, or errors, are computed based on a difference between predicted output data and the expected output data. The value of the loss function may be computed using functions such as the negative log-likelihood loss, the mean squared error, or the Huber loss, or the cross entropy loss. During training, the value of the loss function is typically minimized, and training is terminated when the value of the loss function satisfies a stopping criterion. Sometimes, training is terminated when the value of the loss function satisfies one or more of multiple criteria.

Various methods are known for solving the loss minimization problem such as gradient descent. Quasi-Newton methods, and so forth. Various algorithms have been developed to implement these methods and their variants including but not limited to Stochastic Gradient Descent "SGD", batch gradient descent, mini-batch gradient descent, Gauss-Newton, Levenberg Marquardt, Momentum, Adam, Nadam, Adagrad, Adadelta, RMSProp, and Adamax "optimizers" These algorithms compute the derivative of the loss function with respect to the model parameters using the chain rule. This process is called backpropagation since derivatives are computed starting at the last layer or output layer, moving toward the first layer or input layer. These derivatives inform the algorithm how the model parameters must be adjusted in order to minimize the error function. That is, adjustments to model parameters are made starting from the output layer and working backwards in the network until the input layer is reached. In a first training iteration, the initial weights and biases are often randomized. The neural network then predicts the output data, which is likewise, random, Backpropagation is then used to adjust the weights and the biases. The training process is performed iteratively by making adjustments to the weights and biases in each iteration. Training is terminated when the error, or difference between the predicted output data and the expected output data, is within an acceptable range for the training data, or for some validation data. Subsequently the neural network may be deployed, and the trained neural network makes predictions on new input data using the trained values of its parameters. If the training process was successful, the trained neural network accurately predicts the expected output data from the new input data.

Various techniques for training the neural networks described with reference to FIG. 9 and FIG. 10 are now described with reference to FIG. 11-FIG. 14.

In one example, the neural network 180 is trained using temporal sequences of 3D images representing a flow of a contrast agent through the region of interest 120. In this example, the neural network 180 is trained to predict the images in the temporal sequence of 3D DSA images 110, $3DDSA^{P}_{t}$ from the difference projection data $DSA_t$ by:

- receiving S210 3D angiographic image training data $3DDSA_t$, including a plurality of temporal sequences of 3D images representing a flow of a contrast agent through the region of interest 120;
- projecting S220 the temporal sequences of 3D images $3DDSA_t$ from the source 160*s* onto the detector 160*d* of the source-detector arrangement 160*s*, 160*d* from a plurality of different orientations of the source-detector arrangement with respect to the region of interest 120 to provide simulated difference projection data $SIMDSA_t$, the simulated difference projection data including temporal sequences of simulated projection images representing the flow of the contrast agent through the region of interest 120 whilst the source-detector arrangement 160*s*, 160*d* rotates around the region of interest;
- inputting S230 the simulated difference projection data $SIMDSA_t$ into the neural network 180; and
- for each inputted temporal sequence of simulated projection images;
- predicting S240, from each simulated projection image and zero or more different simulated projection images in the temporal sequence, a 3D image $3DDSA^{P}_{t}$ representing the flow of the contrast agent through the region of interest 120; and
- adjusting S250 parameters of the neural network based on a difference between the predicted 3D image $3DDSA^{P}_{t}$, and the corresponding 3D image $3DDSA_t$ from the temporal sequence in the received 3D angiographic image training data; and
- repeating S260 the predicting S240, and the adjusting S250, until a stopping criterion is met.

Figure 11:
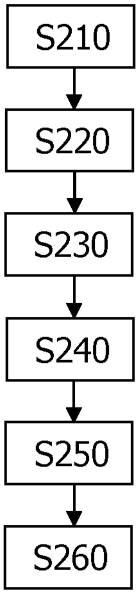
FIG. 11 is a flowchart illustrating an example of a method of training a neural network to predict the images in the temporal sequence of 3D DSA images 110, $3DDSA^P_t$ from difference projection data $DSA_t$, in accordance with some aspects of the present disclosure.
Figure 12:
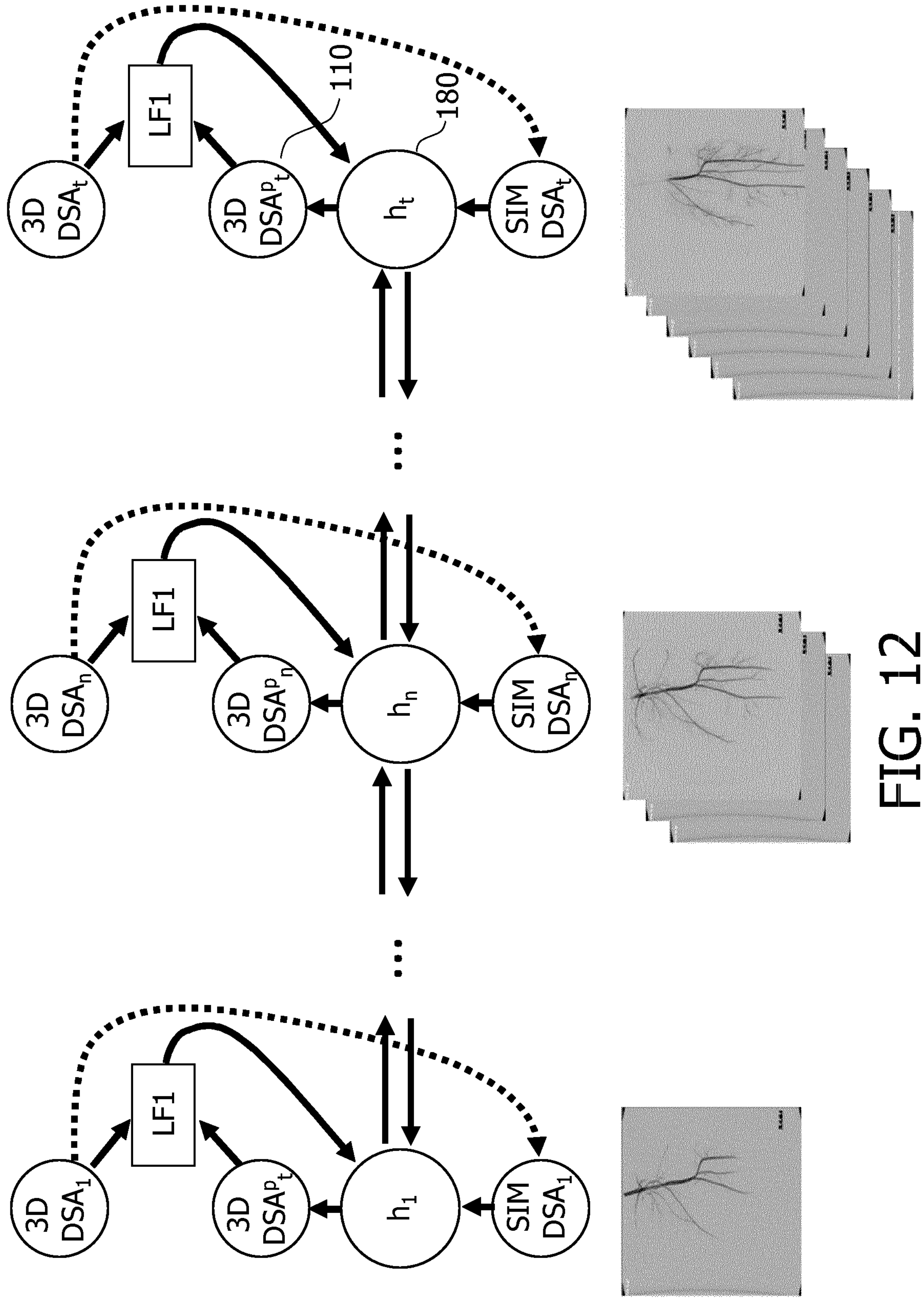
FIG. 12 is a schematic diagram illustrating an example of the training of a neural network 180 to predict the images in a temporal sequence of 3D DSA images 110 from difference projection data $DSA_t$, in accordance with some aspects of the present disclosure.

This example is described with reference to FIG. 11 and FIG. 12. FIG. 11 is a flowchart illustrating an example of a method of training a neural network to predict the images in the temporal sequence of 3D DSA images 110, $3DDSA^{P}_{t}$ from difference projection data $DSA_t$, in accordance with some aspects of the present disclosure. FIG. 12 is a schematic diagram illustrating an example of the training of a neural network 180 to predict the images in a temporal sequence of 3D DSA images 110 from difference projection data $DSA_t$, in accordance with some aspects of the present disclosure. With reference to FIG. 11, in the operation S210, 3D angiographic image training data $3DDSA_t$ is received. The 3D angiographic image training data includes a plurality of temporal sequences of 3D images representing a flow of a contrast agent through the region of interest 120. The 3D angiographic image training data may be generated by a 3D angiographic imaging system, such as a computed tomography angiographic "CTA", 3D rotational angiographic "3DRA", or a magnetic resonance angiographic "MRA" imaging system, for example. When generated by an X-ray-based imaging system, the images may be referred to as TR-3D CTA images, or TR-3D DSA images. The temporal sequences of 3D images may be provided for the region of interest for multiple patients, and for patients with a range of different ages, different genders, a range of body mass index "BMI" values, and so forth. The region of interest may be a cerebral aneurism, for example.

In the operation S220, the temporal sequences of 3D images $3DDSA_t$ are projected from the source 160*s* onto the detector 160*d* of the source-detector arrangement 160*s*, 160*d* from a plurality of different orientations of the source-detector arrangement with respect to the region of interest 120 to provide simulated difference projection data SIMD- $SA_t$. This is illustrated in FIG. 12 by way of the dashed line. With reference to FIG. 2, this operation may be performed by virtually positioning each sequence of 3D images $3DDSA_t$ at the location of the region of interest 120, and rotating the source-detector arrangement 160*s*, 160*d*, around the temporal sequences of 3D image $3DDSA_t$ whilst projecting X-rays from the source 160*s* onto the detector 160*d*. The projection data that is generated at multiple orientations of the source-detector arrangement then provides the simulated difference projection data $SIMDSA_t$. The result of this operation S220 is to provide simulated ground truth projection data that would be acquired by rotating the source-detector arrangement around a region of interest. This operation may be performed using different relative speeds of the temporal sequence and the rotation of the source-detector arrangement in order to increase the amount of training data without needing to acquire additional ground truth data. Alternatively, for instance in the case where TR-3D DSA data is used for training, the projection images acquired in order to reconstruct the TR-3D DSA image may be used directly as the difference projection data $DSA_t$. These projection images may also be used in addition to the simulated difference projection data $SIMDSA_t$.

In the operation S230, the simulated difference projection data $SIMDSA_t$ is inputted into the neural network 180. In the operation S240, a predicted 3D image $3DDSA^P_t$ is generated from the combination of each simulated projection image and zero or more different simulated projection images in the temporal sequence. This operation is illustrated in the lower portion of FIG. 12. In this example, the number of training images that are inputted into the neural network increases over time. At the start of the training data, the first training image, i.e. a single image, is inputted into the neural network 180 as the simulated difference projection data $SIMDSA_1$. Over time, moving towards the right-hand side of FIG. 12, and the number of inputted training images increases. In this example, the images that are inputted into the neural network during training are selected in accordance with the window 190 described above in relation to FIG. 5 and FIG. 6. In other words, at any time, the inputted images include the image in the temporal sequence from the current orientation of the X-ray source-detector arrangement, as well as all the available images from previous orientations of the source-detector arrangement in the temporal sequence. The total number of images that are inputted into the neural network therefore increases over time as the source-detector arrangement rotates around its rotation axis. The neural network 180 may alternatively be trained by inputting images that are selected in a different manner. The inputted images may for example be selected using the windows that are described above with reference to FIG. 7 and FIG. 8.

In the operation S250, the parameters of the neural network 180 are adjusted. This operation may be performed using backpropagation, as described above. The parameters of the neural network are adjusted based on a difference between the predicted 3D image $3DDSA^P_t$, and the corresponding 3D image $3DDSA_t$ from the temporal sequence in the received 3D angiographic image training data. As illustrated in FIG. 12, in this operation, at a given time, t, the neural network 180 predicts the original 3D image $3DDSA_t$ which was used to generate the simulated difference projection data $SIMDSA_t$ that was inputted into the neural network 180 at that time, t. The difference between the predicted 3D image $3DDSA^P_t$, and the corresponding 3D image $3DDSA_t$ from the temporal sequence in the received 3D angiographic image training data, may be calculated using a loss function. In FIG. 12, this is performed by the loss function LF1. The value of this loss function may be calculated using a loss function such as the L1 loss, L2 loss, structural similarity (SSIM) loss, and so forth.

In the operation S260, the operations of predicting S240, and adjusting S250, described above, are repeated until a stopping criterion is met. This criterion may specify, for example, that the value of the loss function LF1 calculated above, is within a desired range.

In another example, the neural network is trained by generating a further projection of the predicted 3D image $3DDSA^P_t$. This example is described with reference to FIG. 13, which is a schematic diagram illustrating an example of the training of a neural network 180 to predict the images in a temporal sequence of 3D DSA images 110 from difference projection data $DSA_t$, and wherein the predicted 3D images 110, $3DDSA^P_t$ are projected from the source onto the detector, in accordance with some aspects of the present disclosure. This example is similar to that described above with reference to FIG. 12. Items in FIG. 13 with the same labels as FIG. 12 perform the same function as that described above with reference to FIG. 12. The example illustrated in FIG. 13 additionally includes the items $DSA^P_t$ and LF2. As compared to the example in FIG. 12, in the example illustrated in FIG. 13, the one or more processors are further configured to:

project the predicted 3D image $3DDSA^P_t$ from the source onto the detector from the orientation of the source-detector arrangement 160*s*, 160*d* with respect to the region of interest 120 used to provide the simulated projection image $SIMDSA_t$; and wherein the adjusting parameters of the neural network is based further on a difference between the projected predicted 3D image $DSA^P_t$, and the simulated projection image $SIMDSA_t$.

Figure 13:
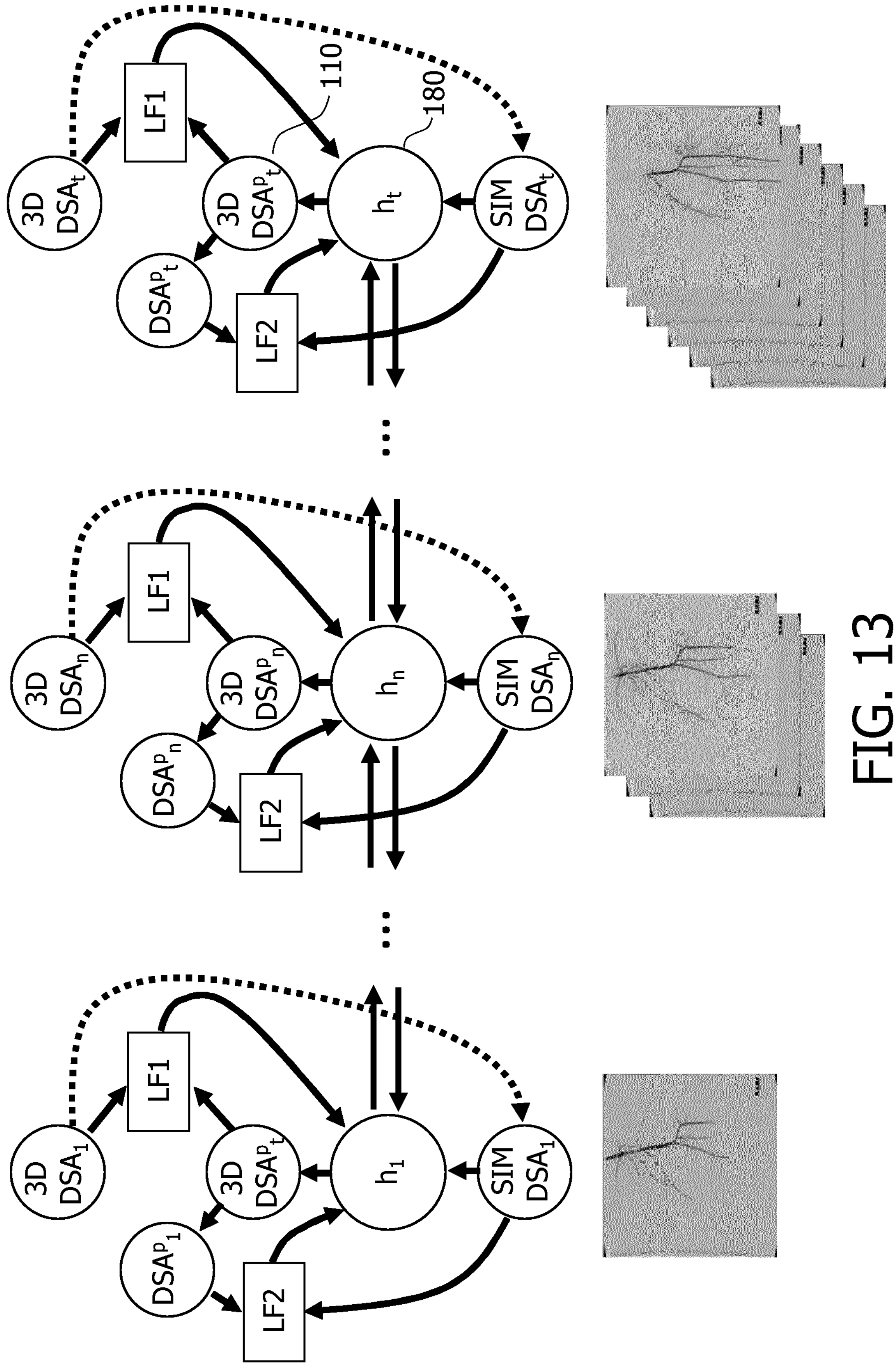
FIG. 13 is a schematic diagram illustrating an example of the training of a neural network 180 to predict the images in a temporal sequence of 3D DSA images 110 from difference projection data $DSA_t$, and wherein the predicted 3D images 110, $3DDSA^P_t$ are projected from the source onto the detector, in accordance with some aspects of the present disclosure.

This projection operation is performed mathematically, and in a similar manner to that described above with reference to FIG. 10 for the projection of the predicted images in the temporal sequence of 3D DSA images $3DDSA^P_t$. In other words, for an inputted image at time t, this projection is performed based on the orientation of the source-detector arrangement with respect to the 3D DSA image $3DDSA^P_t$ at time t, and geometry of the cone beam X-ray imaging system that generates the cone beam projection data 150. In the adjusting operation, the difference between the predicted 3D image $3DDSA^P_t$, and the corresponding 3D image $3DDSA_t$ from the temporal sequence in the received 3D angiographic image training data, is used to adjust the parameters of the neural network 180, as described with reference to FIG. 12. In addition to this, the difference between the projected predicted 3D image $DSA^P_t$, and the simulated projection image $SIMDSA_t$, is also used in the adjusting operation. The value of the difference between the projected predicted 3D image $DSA^P_t$, and the simulated projection image $SIMDSA_t$, is illustrated in FIG. 13 as being calculated using a loss function LF2. As described above, the value of the loss function LF2 may be calculated using a loss function such as the L1 loss, L2 loss, structural similarity (SSIM) loss, and so forth.

As compared to the example in FIG. 12, the constraint that is placed on the training of the neural network via the value of the loss function LF2 in the FIG. 13 example, may be considered to further improve the predictions of the neural network.

In the above examples, the training of the neural network 180 relied upon the existence of temporal sequences of 3D images representing a flow of a contrast agent through the region of interest 120. In some cases, however, such 3D training data may not be available, or it may only be available from a limited number of different patients. In order to address this situation, in another example, rather than using temporal sequences of 3D data, streams of projection data are used to train the neural network 180. In this example, the neural network 180 is trained to predict the images in the temporal sequence of 3D DSA images 110 from the difference projection data DSA, by:

receiving difference training data $DSA_t$, the difference training data comprising a plurality of streams of projection data, each stream representing a flow of a contrast agent through the region of interest 120 whilst a source-detector arrangement 160*s*, 160*d* of a cone beam X-ray imaging system rotates around the region of interest 120 and acquires the projection data from a plurality of orientations of the source-detector arrangement with respect to the region of interest 120;

inputting the difference training data $DSA_t$ into the neural network 180; and for each inputted stream of projection data, and for each of a plurality of orientations of the source-detector arrangement with respect to the region of interest 120;

predicting, from the projection data acquired at the orientation of the source-detector arrangement, and the projection data acquired at zero or more different orientations of the source-detector arrangement, a 3D image $3DDSA^P_t$ representing the flow of the contrast agent through the region of interest 120;

projecting the predicted 3D image $3DDSA^P_t$ onto the detector 160*d* from the orientation of the source-detector arrangement used to provide the projection data $DSA_t$; and adjusting parameters of the neural network based on a difference between the projected predicted 3D image $DSA^P_t$, and the projection data $DSA_t$ acquired at the orientation of the source-detector arrangement; and repeating the predicting, the projecting, and the adjusting, until a stopping criterion is met.

This example is described with reference to FIG. 14, which is a schematic diagram illustrating an example of the training of a neural network 180 to predict the images in a temporal sequence of 3D DSA images 110 from difference projection data DSA, that includes a plurality of streams of projection data, in accordance with some aspects of the present disclosure. In this example, the difference training data DSA is received and used to train the neural network. The difference training data $DSA_t$ includes a plurality of streams of projection data. Each stream represents a flow of a contrast agent through the region of interest 120 whilst a source-detector arrangement 160*s*, 160*d* of a cone beam X-ray imaging system rotates around the region of interest 120 and acquires the projection data from a plurality of orientations of the source-detector arrangement with respect to the region of interest 120.

In this example, the streams of projection data may be provided by a cone beam X-ray imaging system, such as for example a projection X-ray imaging system like a C-arm system, or a cone beam CT, or multi-detector row CT imaging system. The streams of projection data may be generated by the source-detector arrangement illustrated in FIG. 2, and wherein the source-detector arrangement 116*s*, 116*d* rotates around a region of interest whilst acquiring projection data at multiple orientations with respect to the region of interest. Each stream of projection data may correspond to a stream of previously-recorded fluoroscopic images, i.e. live images. Each stream of projection data may correspond to a stream of DSA images. The streams of projection data may be provided for the region of interest for multiple patients, and for patients with a range of different ages, different genders, a range of body mass index "BMI" values, and so forth.

In this example, the difference training data $DSA_t$ is inputted into the neural network 180. This is illustrated in the lower portion of FIG. 14. The difference training data $DSA_t$ that is inputted into the neural network in the FIG. 14 example is selected in a similar manner to that described above for FIG. 12. In other words, the number of training images that are inputted into the neural network increases over time. At the start of the training data, the first training image, i.e. a single image, is inputted into the neural network 180 as the difference projection data $DSA_1$. Over time, moving towards the right-hand side of FIG. 14, and the number of inputted training images increases. In this example, the images that are inputted into the neural network during training are selected in accordance with the window 190 described above in relation to FIG. 5 and FIG. 6. The training may alternatively be performed by inputting images having orientations that are selected in a different manner, such as for example the orientations that are selected by the window 190 described above with reference to FIG. 7 and FIG. 8.

Figure 14:
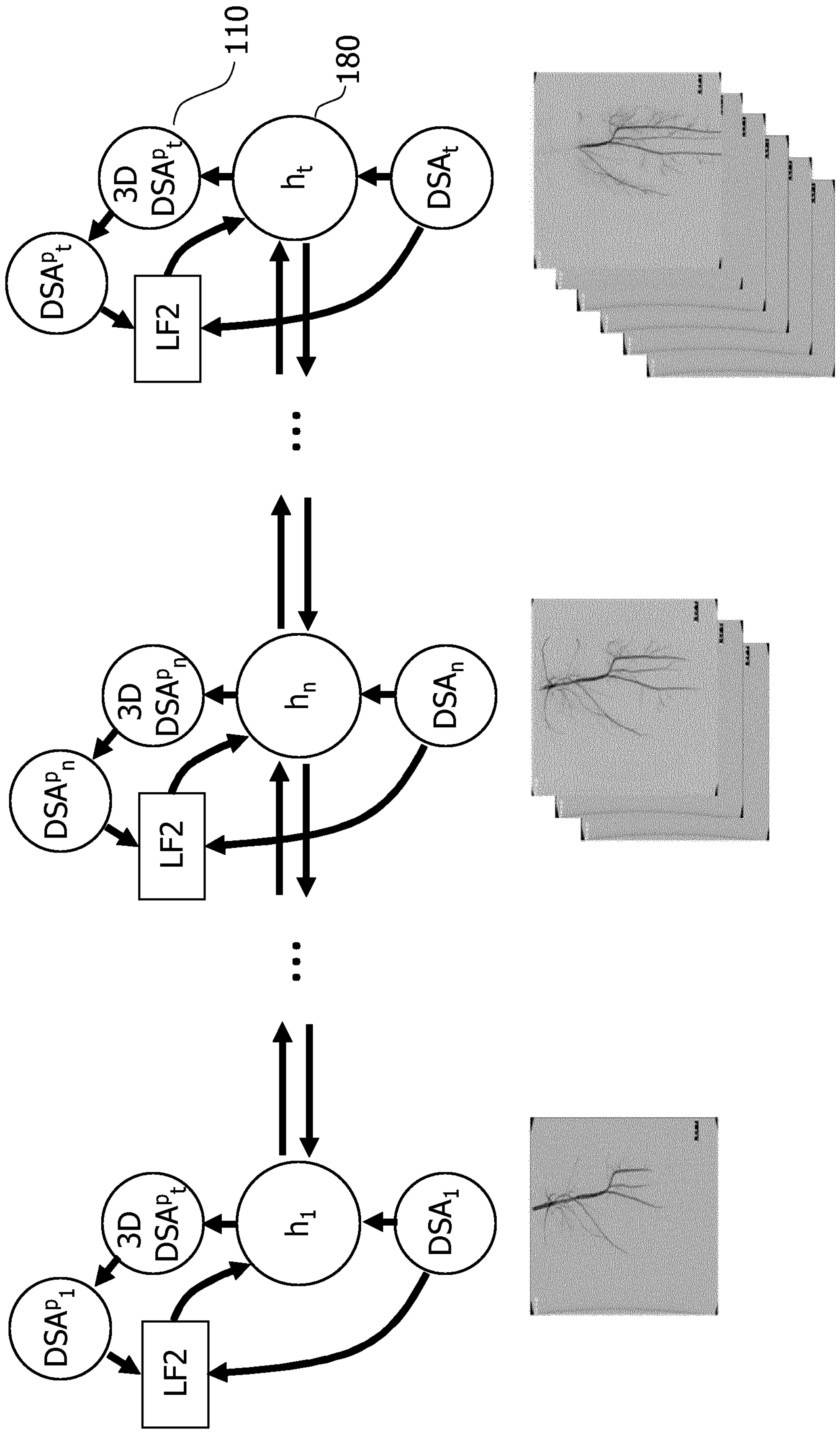
FIG. 14 is a schematic diagram illustrating an example of the training of a neural network 180 to predict the images in a temporal sequence of 3D DSA images 110 from difference projection data DSA, that includes a plurality of streams of projection data, in accordance with some aspects of the present disclosure.

In the FIG. 14 example, the predicted 3D image $3DDSA^P_t$ at each time step is projected onto the detector 160*d* from the orientation of the source-detector arrangement that was used to generate the projection data $DSA_t$. This operation is performed in the same manner as described above with reference to FIG. 13. Subsequently the parameters of the neural network 180 are adjusted based on a difference between the projected predicted 3D image $DSA^P_t$, and the inputted projection data $DSA_t$. This operation is performed by the loss function LF2 illustrated in FIG. 14, and in the same manner as described above with reference to FIG. 13. During training, the operations of predicting, projecting, and adjusting, are repeated until a stopping criterion is met. In this case, the stopping criterion may be that the value of the loss function LF2 is within a desired range.

In the above-described first group of examples, difference projection data was reconstructed into a temporal sequence of 3D DSA images 110 in the operation S130. The difference projection data was generated by performing a subtraction in projection space. In a second group of examples, the cone beam projection data that is acquired from the one or more orientations within the second angular range $Dq_2$, is reconstructed into a temporal sequence of 3D images; and the reconstructed 3D mask image 170 is subsequently subtracted from the reconstructed temporal sequence of 3D images. In other words, a subtraction is performed in image space in the second group of examples. Thus, in the second group of examples, the one or more processors are configured to reconstruct S130 the cone beam projection data 150 acquired from the one or more orientations within the second angular range $Dq_2$, into the temporal sequence of 3D DSA images 110, by:

reconstructing the cone beam projection data acquired from the one or more orientations within the second angular range $Dq_2$ into a temporal sequence of 3D images; and subtracting the reconstructed 3D mask image 170 from the reconstructed temporal sequence of 3D images.

In this second group of examples, the reconstruction of the cone beam projection data may be performed using similar algorithms to those described above for reconstructing the 3D background mask image. These include compressed sensing, iterative reconstruction algorithms, and various neural networks such as generative adversarial networks "GANs", the technique described in the aforementioned document by Langet, H. et al., and so forth. Such algorithms are known for the purpose of reconstructing images that represent static content. In the second group of examples, these algorithms may further be used to reconstruct images that represent moving contrast agent. These reconstruction techniques may likewise be used to reconstruct the temporal sequence of 3D images from the cone beam projection data from the one or more orientations within the second angular range $Dq_2$. These algorithms are suited to reconstructing images from orientations that are obtained from a smaller range of rotational angles than a "complete set". In a similar manner, the neural networks described with reference to FIGS. 9-14 may also be trained, and used, to reconstruct the cone beam projection data acquired from the one or more orientations within the second angular range $Dq_2$ into the temporal sequence of 3D images. Following this, the reconstructed 3D mask image 170 may be subtracted from each image in the reconstructed temporal sequence of 3D images to provide the temporal sequence of 3D DSA images 110.

Various additional elements may also be included in the above-described system. For example, the system 100 may also include one or more of: a cone beam X-ray imaging system 170 for providing the cone beam projection data 150, a monitor for displaying the reconstructed temporal sequence of 3D DSA images 110 and/or other outputs generated by the system, a patient bed, and a user input device (not illustrated in FIG. 1) that is configured to receive user input, such as a keyboard, a mouse, a touchscreen, and so forth.

In accordance with another example, a computer implemented method for reconstructing digital subtraction angiography, DSA, images 110 representing a region of interest 120 in an object 130, is provided. The method comprises:

receiving S110 cone beam projection data 150 acquired during a portion of a revolution of a source-detector arrangement 160*s*, 160*d* of a cone beam X-ray imaging system 170 around the object 130, the portion of the revolution comprising a first angular range $Dq_1$ including one or more orientations of the source-detector arrangement 160*s*, 160*d* prior to a contrast agent entering the region of interest 120 and/or subsequent to the contrast leaving the region of interest 120, and a second angular range $Dq_2$ including one or more orientations of the source-detector arrangement 160*s*, 160*d* whilst the contrast agent flows within the region of interest 120;

reconstructing S120 the cone beam projection data 150 acquired from the one or more orientations within the first angular range $Dq_1$, into a 3D mask image 170 representing the region of interest 120; and reconstructing S130 the cone beam projection data 150 acquired from the one or more orientations within the second angular range $Dq_2$, into a temporal sequence of 3D DSA images 110 representing the region of interest 120, based on the reconstructed 3D mask image 170.

In accordance with another example, a computer program product is provided. The computer program product includes instructions which when executed by one or more processors, cause the one or more processors to carry out a method of reconstructing digital subtraction angiography, DSA, images 110 representing a region of interest 120 in an object 130, is provided. The method comprises:

receiving S110 cone beam projection data 150 acquired during a portion of a revolution of a source-detector arrangement 160*s*, 160*d* of a cone beam X-ray imaging system 170 around the object 130, the portion of the revolution comprising a first angular range $Dq_1$ including one or more orientations of the source-detector arrangement 160*s*, 160*d* prior to a contrast agent entering the region of interest 120 and/or subsequent to the contrast leaving the region of interest 120, and a second angular range $Dq_2$ including one or more orientations of the source-detector arrangement 160*s*, 160*d* whilst the contrast agent flows within the region of interest 120;

reconstructing S120 the cone beam projection data 150 acquired from the one or more orientations within the first angular range $Dq_1$, into a 3D mask image 170 representing the region of interest 120; and reconstructing S130 the cone beam projection data 150 acquired from the one or more orientations within the second angular range $Dq_2$, into a temporal sequence of 3D DSA images 110 representing the region of interest 120, based on the reconstructed 3D mask image 170.

The above examples are to be understood as illustrative of the present disclosure, and not restrictive. Further examples are also contemplated. For instance, the examples described in relation to the system 100, may also be provided by the computer-implemented method, or by the computer program product, or by a computer-readable storage medium, in a corresponding manner. It is to be understood that a feature described in relation to any one example may be used alone, or in combination with other described features, and may be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A system for reconstructing digital subtraction angiography (DSA) images representing a region of interest in an object, the system comprising:

one or more processors in communication with memory, the one or more processors configured to:

receive cone beam projection data acquired during a portion of a revolution of a source-detector arrangement of a cone beam X-ray imaging system around the object, the portion of the revolution comprising a first angular range including one or more orientations of the source-detector arrangement prior to a contrast agent entering the region of interest and/or subsequent to the contrast leaving the region of interest, and a second angular range including one or more orientations of the source-detector arrangement whilst the contrast agent flows within the region of interest;

reconstruct the cone beam projection data acquired from the one or more orientations within the first angular range, into a 3D mask image representing the region of interest; and reconstruct the cone beam projection data acquired from the one or more orientations within the second angular range, into a temporal sequence of 3D DSA images representing the region of interest, based on the reconstructed 3D mask image.

2. The system according to claim 1, wherein to reconstruct the cone beam projection data acquired from the one or more orientations within the second angular range, into the temporal sequence of 3D DSA images, the one or more processors are configured to:

subtract, from the cone beam projection data acquired from the one or more orientations within the second angular range, synthetic projection data generated by projecting the reconstructed 3D mask image from the source onto the detector from the one or more corresponding orientations of the source-detector arrangement within the second angular range, to generate difference projection data at the one or more orientations within the second angular range; and reconstruct the difference projection data to provide the temporal sequence of 3D DSA images.

3. The system according to claim 2, wherein to reconstruct the difference projection data to provide the temporal sequence of 3D DSA images, the one or more processors are configured to:

input the difference projection data generated at the one or more orientations within the second angular range into a neural network; and predict the images in the temporal sequence of 3D DSA images in response to the inputting, wherein the neural network is trained to predict the images in the temporal sequence of 3D DSA images from the difference projection data.

4. The system according to claim 3, wherein the neural network is trained to predict each image in the temporal sequence of 3D DSA images from the difference projection data generated at the one or more orientations within the second angular range; and wherein the difference projection data used to reconstruct each image in the temporal sequence represents a window of rotational angles within the second angular range, and wherein the window has a leading edge corresponding to an orientation of the source-detector arrangement that rotates around the object in accordance with a time of the image in the temporal sequence.

5. The system according to claim 3, wherein the one or more processors are further configured to project each predicted image in the temporal sequence of 3D DSA images from the source onto the detector from the orientation of the X-ray source-detector arrangement used to generate the difference projection data, to provide projected predicted image data, and wherein the neural network is trained to predict each image in the temporal sequence of 3D DSA images from the difference projection data based on a value of a loss function representing a difference between the projected predicted image data, and the difference projection data generated at the corresponding orientation.

6. The system according to claim 3, wherein the one or more processors are further configured to output a confidence value for the images in the predicted temporal sequence of 3D DSA images.

7. The system according to claim 1, wherein to reconstruct the cone beam projection data acquired from the one or more orientations within the second angular range, into the temporal sequence of 3D DSA images, the one or more processors are configured to:

reconstruct the cone beam projection data acquired from the one or more orientations within the second angular range into a temporal sequence of 3D images; and subtract the reconstructed 3D mask image from the reconstructed temporal sequence of 3D images.

8. The system according to claim 1, wherein the cone beam X-ray imaging system further comprises a second source-detector arrangement, the second source-detector arrangement being arranged transversely with respect to the source-detector arrangement; and wherein the one or more processors are configured to:

reconstruct the 3D mask image using the cone beam projection data acquired from both the source-detector arrangement and the second source-detector arrangement; and reconstruct the temporal sequence of 3D DSA images using the cone beam projection data acquired from both the source-detector arrangement and the second source-detector arrangement, based on the reconstructed 3D mask image.

9. The system according to claim 1, wherein the second angular range includes a plurality of orientations of the source-detector arrangement, and wherein the one or more processors are configured to:

reconstruct each image in the temporal sequence of 3D DSA images using cone beam projection data acquired from a subset of the plurality of orientations within the second angular range, wherein the subset of orientations used to reconstruct each image in the temporal sequence represents a window of rotational angles within the second angular range, and wherein the window has a leading edge corresponding to an orientation of the source-detector arrangement that rotates around the object in accordance with a time of the image in the temporal sequence.

10. The system according to claim 9, wherein the window has a trailing edge corresponding to an orientation of the source-detector arrangement that rotates around the object in accordance with a time of the image in the temporal sequence.

11. The system according to claim 1, wherein the one or more processors are configured to reconstruct the 3D mask image based further on cone beam projection data acquired from one or more orientations within the second angular range.

12. The system according to claim 3, wherein the neural network is trained to predict the images in the temporal sequence of 3D DSA images from the difference projection data and, to train the neural network, a processor is configured to:

Receive 3D angiographic image training data, including a plurality of temporal sequences of 3D images representing a flow of a contrast agent through the region of interest;

project the temporal sequences of 3D images from the source onto the detector of the source-detector arrangement from a plurality of different orientations of the source-detector arrangement with respect to the region of interest to provide simulated difference projection data, the simulated difference projection data including temporal sequences of simulated projection images representing the flow of the contrast agent through the region of interest whilst the source-detector arrangement rotates around the region of interest;

input the simulated difference projection data into the neural network; and for each inputted temporal sequence of simulated projection images:

predict, from each simulated projection image and zero or more different simulated projection images in the temporal sequence, a 3D image representing the flow of the contrast agent through the region of interest; and adjust parameters of the neural network based on a difference between the predicted 3D image, and the corresponding 3D image from the temporal sequence in the received 3D angiographic image training data.

13. The system according to claim 12, wherein the one or more processors are further configured to:

project the predicted 3D image from the source onto the detector from the orientation of the source-detector arrangement with respect to the region of interest used to provide the simulated projection image, wherein the adjusting parameters of the neural network is based further on a difference between the projected predicted 3D image, and the simulated projection image.

14. The system according to claim 3, wherein the neural network is trained to predict the images in the temporal sequence of 3D DSA images from the difference projection data and, to train the neural network, a processor is configured to:

receive difference training data, the difference training data comprising a plurality of streams of projection data, each stream representing a flow of a contrast agent through the region of interest whilst a source-detector arrangement of a cone beam X-ray imaging system rotates around the region of interest and acquires the projection data from a plurality of orientations of the source-detector arrangement with respect to the region of interest;

input the difference training data into the neural network; and for each inputted stream of projection data, and for each of a plurality of orientations of the source-detector arrangement with respect to the region of interest:

predict, from the projection data acquired at the orientation of the source-detector arrangement, and the projection data acquired at zero or more different orientations of the source-detector arrangement, a 3D image representing the flow of the contrast agent through the region of interest;

project the predicted 3D image onto the detector from the orientation of the source-detector arrangement used to provide the projection data; and adjust parameters of the neural network based on a difference between the projected predicted 3D image, and the projection data acquired at the orientation of the source-detector arrangement.

15. The system according to claim 1, at least one of:

wherein the one or more processors are configured to reconstruct the cone beam projection data acquired from the one or more orientations within the first angular range, into the 3D mask image representing the region of interest, using an iterative reconstruction technique, or using a neural network; and wherein the one or more processors are further configured to apply a noise reduction technique, or an artifact reduction technique, to the cone beam projection data, prior to reconstructing the 3D mask image.

16. A method for reconstructing DSA images representing a region of interest in an object, the method comprising:

receiving cone beam projection data acquired during a portion of a revolution of a source-detector arrangement of a cone beam X-ray imaging system around the object, the portion of the revolution comprising a first angular range including one or more orientations of the source-detector arrangement prior to a contrast agent entering the region of interest and/or subsequent to the contrast leaving the region of interest, and a second angular range including one or more orientations of the source-detector arrangement whilst the contrast agent flows within the region of interest;

reconstructing the cone beam projection data acquired from the one or more orientations within the first angular range, into a 3D mask image representing the region of interest; and reconstructing the cone beam projection data acquired from the one or more orientations within the second angular range, into a temporal sequence of 3D DSA images representing the region of interest, based on the reconstructed 3D mask image.

17. The method according to claim 16, wherein reconstructing the cone beam projection data acquired from the one or more orientations within the second angular range, into the temporal sequence of 3D DSA images, comprises:

subtracting, from the cone beam projection data acquired from the one or more orientations within the second angular range, synthetic projection data generated by projecting the reconstructed 3D mask image from the source onto the detector from the one or more corresponding orientations of the source-detector arrangement within the second angular range, to generate difference projection data at the one or more orientations within the second angular range; and reconstructing the difference projection data to provide the temporal sequence of 3D DSA images.

18. A non-transitory computer-readable storage medium having stored a computer program comprising instructions which, when executed by a processor, cause the processor to:

receive cone beam projection data acquired during a portion of a revolution of a source-detector arrangement of a cone beam X-ray imaging system around the object, the portion of the revolution comprising a first angular range including one or more orientations of the source-detector arrangement prior to a contrast agent entering the region of interest and/or subsequent to the contrast leaving the region of interest, and a second angular range including one or more orientations of the source-detector arrangement whilst the contrast agent flows within the region of interest;

reconstruct the cone beam projection data acquired from the one or more orientations within the first angular range, into a 3D mask image representing the region of interest; and reconstruct the cone beam projection data acquired from the one or more orientations within the second angular range, into a temporal sequence of 3D DSA images representing the region of interest, based on the reconstructed 3D mask image.

19. The non-transitory computer-readable storage medium according to claim 18, wherein to reconstruct the cone beam projection data acquired from the one or more orientations within the second angular range, into the temporal sequence of 3D DSA images, the instructions, when executed by the processor further cause the processor to:

subtract, from the cone beam projection data acquired from the one or more orientations within the second angular range, synthetic projection data generated by projecting the reconstructed 3D mask image from the source onto the detector from the one or more corresponding orientations of the source-detector arrangement within the second angular range, to generate difference projection data at the one or more orientations within the second angular range; and reconstruct the difference projection data to provide the temporal sequence of 3D DSA images.

20. The non-transitory computer-readable storage medium according to claim 19, wherein to reconstruct the difference projection data to provide the temporal sequence of 3D DSA images, the instructions, when executed by the processor further cause the processor to:

input the difference projection data generated at the one or more orientations within the second angular range into a neural network; and predict the images in the temporal sequence of 3D DSA images in response to the inputting, wherein the neural network is trained to predict the images in the temporal sequence of 3D DSA images from the difference projection data.

* * * * *